United States Patent
Takano

(10) Patent No.: US 10,045,315 B2
(45) Date of Patent: Aug. 7, 2018

(54) TERMINAL DEVICE AND COMMUNICATION CONTROL METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 177 days.

(21) Appl. No.: 14/767,365

(22) PCT Filed: Dec. 2, 2013

(86) PCT No.: PCT/JP2013/082395
§ 371 (c)(1),
(2) Date: Aug. 12, 2015

(87) PCT Pub. No.: WO2014/132515
PCT Pub. Date: Sep. 4, 2014

(65) Prior Publication Data
US 2015/0373655 A1    Dec. 24, 2015

(30) Foreign Application Priority Data

Feb. 28, 2013  (JP) .................. 2013-038670

(51) Int. Cl.
*H04W 56/00* (2009.01)
(52) U.S. Cl.
CPC ......... *H04W 56/001* (2013.01); *H04W 56/00* (2013.01)
(58) Field of Classification Search
CPC ..................... H04W 56/001; H04W 56/00
See application file for complete search history.

(56) References Cited

U.S. PATENT DOCUMENTS 6,351,468 B1 * 2/2002 LaRowe, Jr. ..... H04W 72/0453
                                                        370/443
2009/0170440 A1 * 7/2009 Eyuboglu ............ H04W 36/06
                                                        455/63.3
(Continued)

FOREIGN PATENT DOCUMENTS

JP    2011-120196 A    6/2011
WO   2010/105148 A1   9/2010
(Continued)

OTHER PUBLICATIONS

Extended European Search Report of PCT Application No. PCT/JP2013082395, dated Sep. 20, 2016, pp. 08.
(Continued)

*Primary Examiner* — Andrew Lai
*Assistant Examiner* — Harry H Kim
(74) *Attorney, Agent, or Firm* — Chip Law Group

(57) ABSTRACT

Provided is a terminal device including: a communication control unit configured to control a radio communication function so as to establish synchronization in a second frequency band by a synchronization signal transmitted in the second frequency band synchronized with a first frequency band, and to establish synchronization in the first frequency band by utilizing a synchronization result in the second frequency band. The first frequency band is synchronized with a third frequency band. The communication control unit controls the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

20 Claims, 23 Drawing Sheets

(56) References Cited

U.S. PATENT DOCUMENTS

| | | | |
|---|---|---|---|
| 2009/0227248 A1* | 9/2009 | Chance | H03J 7/065 |
| | | | 455/423 |
| 2010/0074199 A1* | 3/2010 | Shin | H04J 11/0093 |
| | | | 370/329 |
| 2012/0082152 A1 | 4/2012 | Baldemair et al. | |
| 2012/0320833 A1* | 12/2012 | Yamamoto | H04L 5/0053 |
| | | | 370/328 |
| 2015/0030000 A1* | 1/2015 | Suzuki | H04W 36/0055 |
| | | | 370/331 |
| 2017/0265157 A1* | 9/2017 | Futaki | H04J 11/0069 |

FOREIGN PATENT DOCUMENTS

| | | |
|---|---|---|
| WO | 2011/108028 A1 | 9/2011 |
| WO | 2011/116242 A1 | 9/2011 |
| WO | 2011108028 A1 | 9/2011 |

OTHER PUBLICATIONS

NTT Docomo, "Further Views on Synchronized New Carrier Type Scenarios", 3GPP TSG RAN WG1 Meeting #69 R1-122375, May 21-May 25, 2012, pp. 4, Prague, Czech Republic.

Office Action for JP Patent Application No. 2015-502720, dated Dec. 12, 2017, 03 pages of Office Action and 03 pages of English Translation.

"Further Views on Synchronized New Carrier Type Scenarios", 3GPP TSG RAN WG1 Meeting #69, R1-122375, Prague, Czech Republic, May 21-25, 2012, 04 pages.

NTT DOCOMO, "Further Views on Synchronized New Carrier Type Scenarios", 3GPP TSG RAN WG1 Meeting 69, R1-122375, Prague, Czech Republic, May 21-25, 2012, 4 pages.

Office Action for JP Patent Application No. 2015-502720, dated Jun. 12, 2018, 02 pages of Office Action and 01 pages of English Translation.

* cited by examiner

FIG. 7

| SUPPLY METHOD | UE STATE NECESSARY FOR SUPPLY | SUPPLY TARGET UE (SUPPLIED INFORMATION) | SUPPLIABLE INFORMATION AMOUNT |
|---|---|---|---|
| SYSTEM INFORMATION | RRC_CONNECTED OR RRC_IDLE | ALL UES (INFORMATION COMMON TO UES) | SMALL |
| RRC SIGNALING | RRC_CONNECTED | INDIVIDUAL UE (INDIVIDUAL INFORMATION FOR EACH UE OR INFORMATION COMMON TO UES) | LARGE |

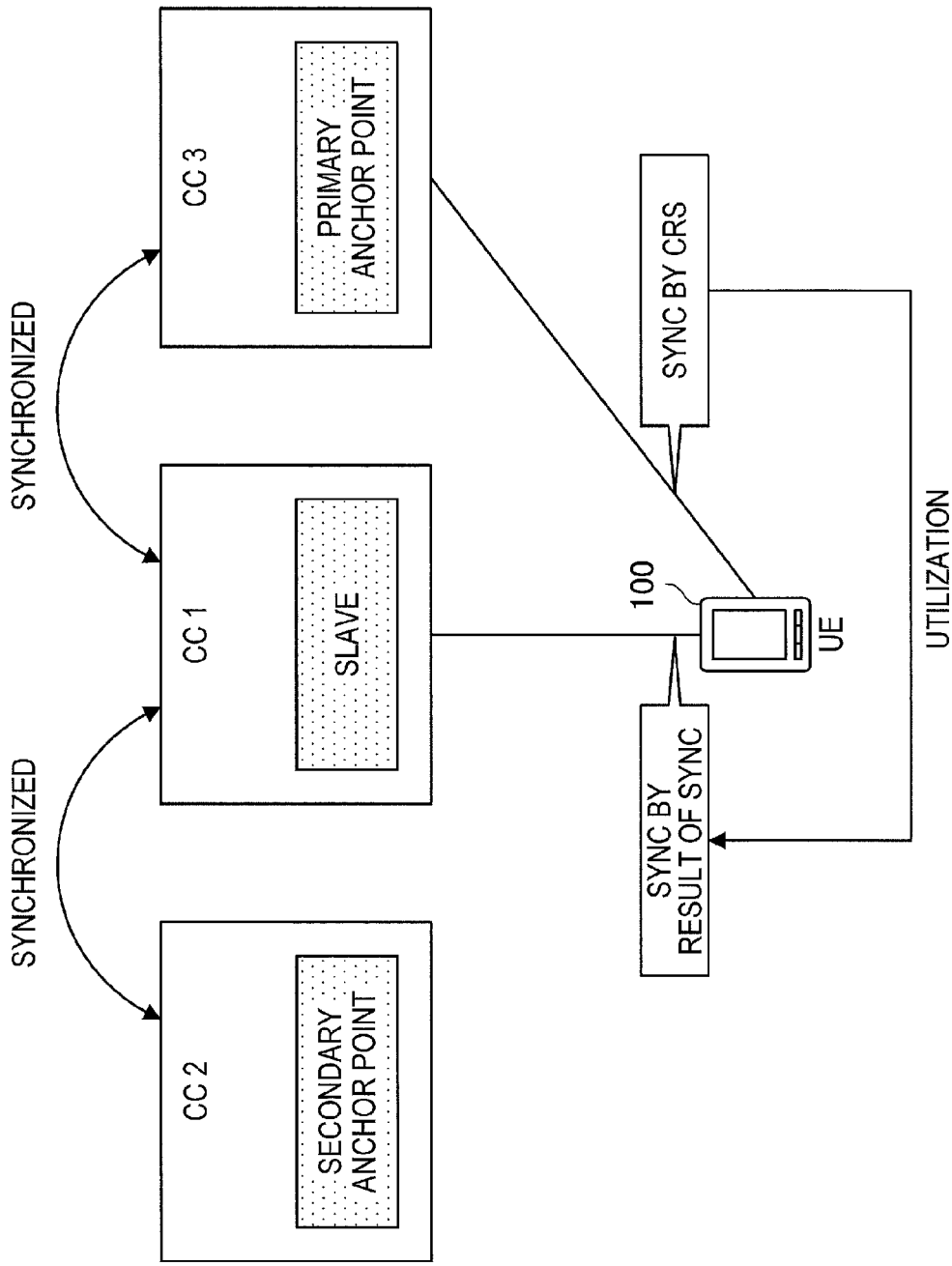

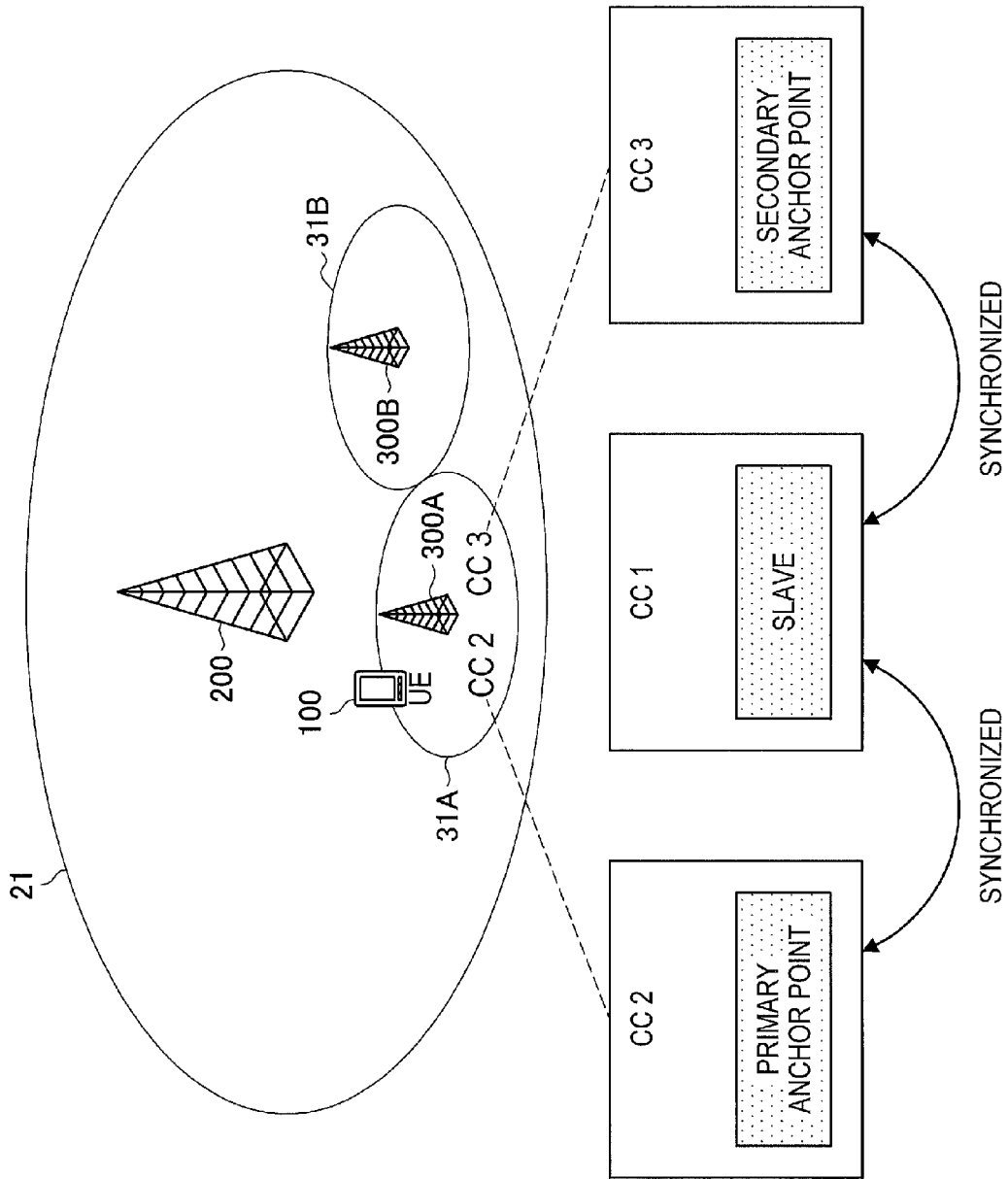

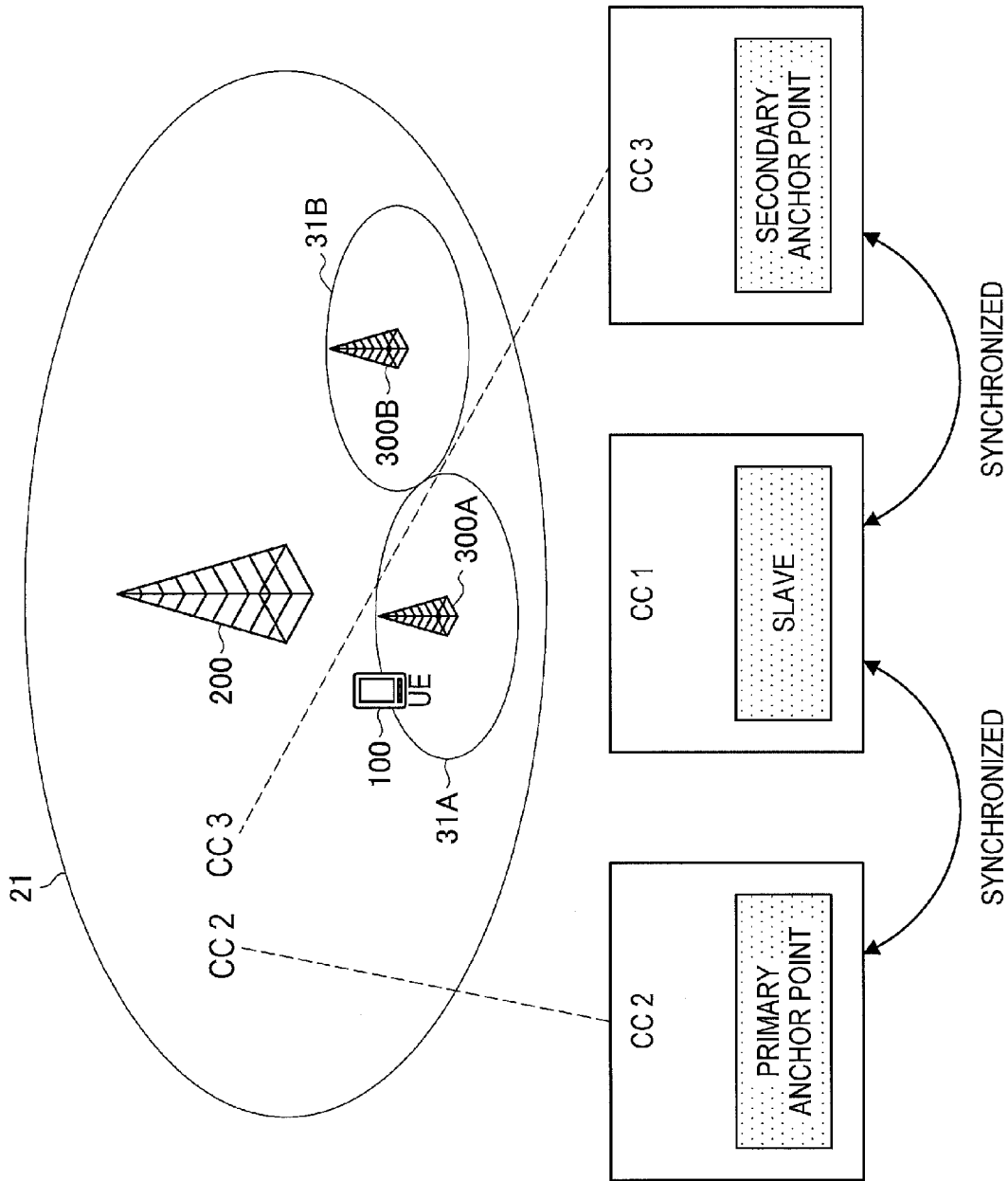

TERMINAL DEVICE AND COMMUNICATION CONTROL METHOD

TECHNICAL FIELD

The present disclosure relates to a terminal device, a program, and a communication control method.

BACKGROUND ART

At present, 4G radio communication systems have been standardized by the Third Generation Partnership Project (3GPP). In 4G, technologies such as carrier aggregation, relay, and Multi-User Multiple-Input Multiple-Output (MU-MIMO) have been noticed.

In particular, carrier aggregation is a technology capable of collectively handling, for example, five frequency bands with a bandwidth of 20 MHz to handle a bandwidth of 20 MHz×5=100 MHz. According to carrier aggregation, an advance in the maximum throughput is expected. Various technologies related to such carrier aggregation have been investigated.

For example, Patent Literature 1 discloses a technology for suppressing deterioration in throughput by controlling assignment of a measurement gap for each component carrier (CC) based on a determination result of urgency of handover.

CITATION LIST

Patent Literature

Patent Literature 1: JP 2011-120196A

SUMMARY OF INVENTION

Technical Problem

On the other hand, in Release 11 of the 3GPP, new carrier types (NCTs) have been investigated as new component carriers apart from legacy CCs (existing CCs) capable of maintaining backward compatibility. Here, the NCTs are assumed to be new types of CCs as well as CCs of the types. Further, as the NCTs, an NCT (Synchronized New Carrier Type: SNCT) synchronized with the legacy CC and an NCT (Unsynchronized New Carrier Type: UNCT) not synchronized with the legacy CC have been investigated.

The SNCT is synchronized with any legacy CC. Therefore, when a user equipment (UE) establishes synchronization in one CC between the mutually synchronized SNCT and the legacy CC, a synchronization result of the UE in the one CC can be used for the other CC. That is, the UE does not have to establish separate synchronization with a synchronization signal (for example, a common reference signal (CRS)) in the other CC. Furthermore, even in a case where sufficient CRSs are not transmitted in the SNCT and the UE cannot establish synchronization individually by the CRS in the SNCT, the UE can establish synchronization in the SNCT by utilizing the synchronization result in the legacy CC.

The UNCT is not synchronized with any legacy CC, but can be synchronized with different UNCTs. When the UE establishes synchronization in one UNCT among two or more mutually synchronized UNCTs, a synchronization result of the UE in the one UNCT can be utilized for the different CCs. That is, the UE does not have to establish separate synchronization with a synchronization signal in the other CCs. Furthermore, even in a case where sufficient CRSs are not transmitted in one of the UNCTs and the UE cannot establish synchronization individually by the CRS in the one of the UNCTs, the UE can establish synchronization in the one of the UNCTs by utilizing the synchronization result in the other UNCTs.

However, in a case where the UE establishes synchronization by the CRS in a particular CC and establishes synchronization in another CC by utilizing the synchronization result in the particular CC, it is possible that the synchronization cannot be established by the CRS in the particular CC. Then, when the UE cannot establish synchronization in the particular CC, the UE cannot utilize the synchronization result in the particular CC. As a result, when the synchronization state is lost in the particular CC, the synchronization state is lost also in the other CCs. That is, the communication quality of the radio communication by the UE is damaged.

Thus, it is desirable to provide a mechanism that can further stabilize the communication quality of the radio communication by the terminal device when the terminal device utilizes the synchronization result in a particular frequency band for another frequency band.

Solution to Problem

According to the present disclosure, there is provided a terminal device including: a communication control unit configured to control a radio communication function so as to establish synchronization in a second frequency band by a synchronization signal transmitted in the second frequency band synchronized with a first frequency band, and to establish synchronization in the first frequency band by utilizing a synchronization result in the second frequency band. The first frequency band is synchronized with a third frequency band. The communication control unit controls the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

According to the present disclosure, there is provided a program for causing a computer to function as: a communication control unit configured to control a radio communication function so as to establish synchronization in a second frequency band by a synchronization signal transmitted in the second frequency band synchronized with a first frequency band, and to establish synchronization in the first frequency band by utilizing a synchronization result in the second frequency band. The first frequency band is synchronized with a third frequency band. The communication control unit controls the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

According to the present disclosure, there is provided a communication control method including: controlling a radio communication function so as to establish synchronization in a second frequency band by a synchronization signal transmitted in the second frequency band synchronized with a first frequency band, and to establish synchronization in the first frequency band by utilizing a synchronization result in the second frequency band. The first frequency band is synchronized with a third frequency band. The communication control method further includes controlling the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

Advantageous Effects of Invention

As described above, according to the present disclosure, it becomes possible to further stabilize the communication quality of the radio communication by the terminal device when the terminal device utilizes the synchronization result in a particular frequency band for another frequency band.

BRIEF DESCRIPTION OF DRAWINGS

FIG. 7 is an explanatory diagram illustrating characteristics of system information and RRC signaling.

FIG. 12B is an explanatory diagram illustrating an example of a state after switching of a primary anchor point.

FIG. 13 is an explanatory diagram illustrating an example of Case 1 in which a primary anchor point and a secondary anchor point are CCs used in a same pico cell.

FIG. 14 is an explanatory diagram illustrating an example of Case 2 in which a primary anchor point and a secondary anchor point are CCs used in a same macro cell.

DESCRIPTION OF EMBODIMENTS

Figure 1:
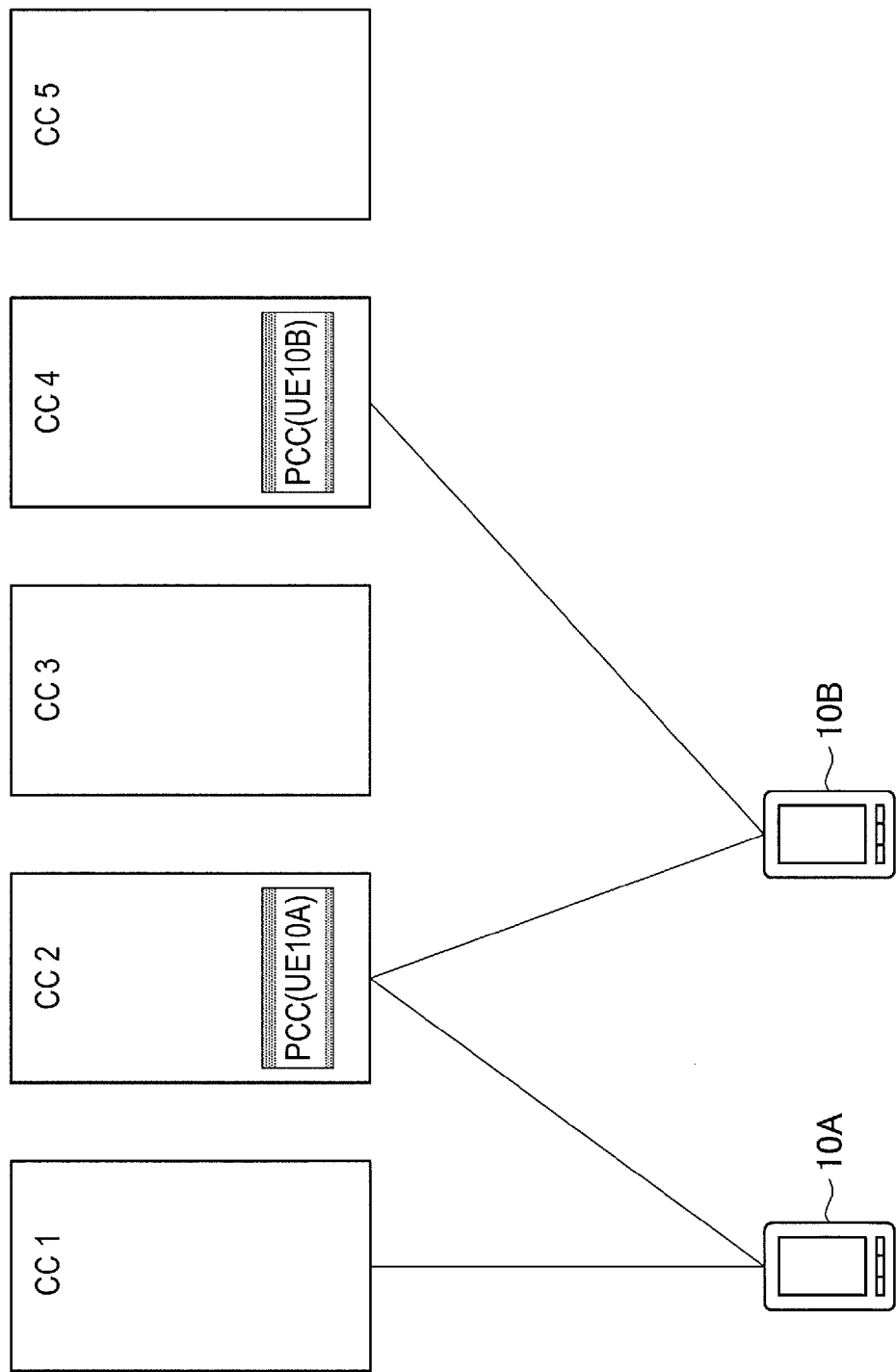
FIG. 1 is an explanatory diagram illustrating an example of a PCC of each UE.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Technology for radio communication in 3GPP
2. Technical problems related to embodiment of the present disclosure
2.1 Examination of synchronization between frequency bands
2.2 Technical problems
3. Schematic configuration of communication system according to the present embodiment
4. Configuration of UE
5. Flow of process
6. Application examples
7. Conclusion

1. TECHNOLOGY FOR RADIO COMMUNICATION IN 3GPP

First, a technology for radio communication in the 3GPP will be described as a premise.
(Carrier Aggregation of Release 10)
Component Carrier
In carrier aggregation of Release 10, up to five component carriers (CCs) are bundled and used by a UE. Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.
Primary CC and Secondary CC
In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 1.

FIG. 1 is an explanatory diagram illustrating an example of the PCC of each UE. A UE 10A, a UE 10B, and five CCs 1 to 5 are illustrated in FIG. 1. In this example, the UE 10A uses two CCs, the CC 1 and the CC 2. The UE 10A uses the CC 2 as the PCC. On the other hand, the UE 10B uses two CCs, the CC 2 and the CC 4. The UE 10B uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE cannot use only the SCC, but necessarily uses one PCC.

The PCC is also referred to as a primary cell. The SCC is also referred to as a secondary cell.

Synchronization by UE in CRS

In carrier aggregation, a common reference signal (CRS) is transmitted in each CC. A UE establishes synchronization in each CC by the CRS. In the present specification, "synchronization (by the UE in the CC)" means that the UE adjusts (for example, tracks synchronization) a timing and/or a frequency in reception of a signal so that a signal can be correctly received in the CC. The common reference signal is also referred to as a cell-specific reference signal.

(Background of NCT of Release 11)

In carrier aggregation, each CC has been assumed to be able to be used by a legacy UE (that is, an existing UE) from the viewpoint of guarantee of backward compatibility. However, the definition of a CC that cannot be used by a legacy UE but is more efficient has started to be investigated. That is, definition of new CCs referred to as new carrier types (NCT) or additional carriers has started to be investigated.

The ultimate motivation for the NCT is to reduce overhead of the CCs. Overhead is radio resources other than radio resources utilized to transmit user data. That is, overhead is radio resources utilized for control. When overhead increases, the radio resources that can be utilized to transmit user data may decrease. Therefore, the increase in overhead is not preferable. One cause of overhead is a CRS present in each CC in a downlink. This point will be described more specifically below with reference to FIG. 2.

Figure 2:
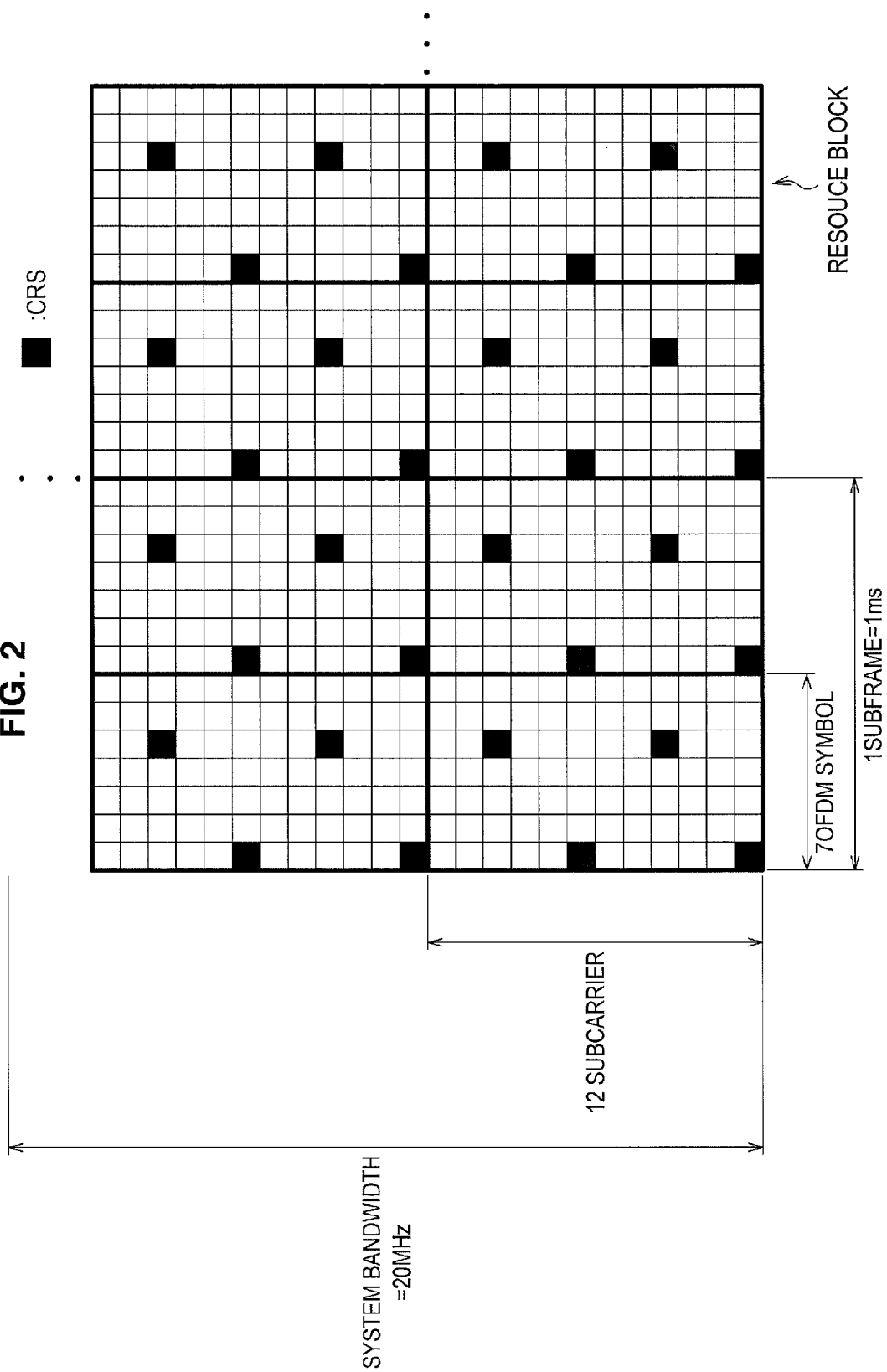
FIG. 2 is an explanatory diagram illustrating an example of a CRS transmitted in a CC on a downlink.

FIG. 2 is an explanatory diagram illustrating an example of a CRS transmitted in a CC on a downlink. Several radio resource blocks (RBs) corresponding to the CCs of 20 MHz are illustrated in FIG. 2. Each RB has a width of 12 subcarriers in a frequency direction and a width of 7 Orthogonal Frequency Division Multiplexing (OFDM) symbols in a time direction. The CRSs are transmitted in each RB. That is, the CRSs are transmitted in all of the RBs present across the bandwidth of the CCs in the frequency direction and present for each slot in the time direction. Accordingly, the CRS is transmitted in each CC and each subframe.

One objective of the CRS is for a UE to establish synchronization. As the synchronization, there is time synchronization (or timing synchronization) which is synchronization in the time direction and frequency synchronization which is synchronization in the frequency direction. The UE can establish synchronization with high precision in the frequency direction and the time direction by the CRS. Further, the UE continues to establish synchronization by the CRS.

Another objective of the CRS is that the UE properly demodulates a downlink signal. The UE demodulates different received signals based on the phases of the CRSs.

The common reference signal (CRS) is the most fundamental reference signal (RS) introduced in Release 8. On the other hand, at present, there is an intermittently transmitted RS such as a channel state information-reference signal (CSI-RS). The RS is used to demodulate a downlink signal. Accordingly, a current objective of the CRS is mainly that the UE can establish synchronization. Therefore, as far as the UE can establish synchronization, the interval at which the CRS is transmitted can be decreased.

(Reduction in CRSs Investigated in NTC in Release 11)

Kinds of NCTs

As the NCTs investigated in Release 11, there are broadly two kinds of NCTs.

One of the two kinds of NCTs is an NCT that is synchronized with a legacy CC (that is, an existing CC). When the UE establishes synchronization in a legacy CC, the UE can utilize a synchronization result of the UE in the legacy CC for the NCT synchronized with the legacy CC. Such an NCT is referred to as a synchronized NCT (hereinafter referred to as an "SNCT"). Further, in the present specification, "utilize the synchronization result (of the UE in the CC) (for a different CC)" means that a reception timing and a reception frequency in the different CC are acquired from a reception timing and a reception frequency in the CC.

The other of the two kinds of NCTs is an NCT that is not synchronized with a legacy CC. The UE necessarily establishes synchronization in an NCT. Such an NCT is referred to as an unsynchronized NCT (hereinafter referred to as an "UNCT"). Since the synchronization process is necessary in the UNCT, the CRSs are transmitted in the UNCT.

As described above, as the NCT, there are the SNCT and the UNCT. Hereinafter, specific examples of the SNCT and the UNCT will be described with reference to FIG. 3.

Figure 3:
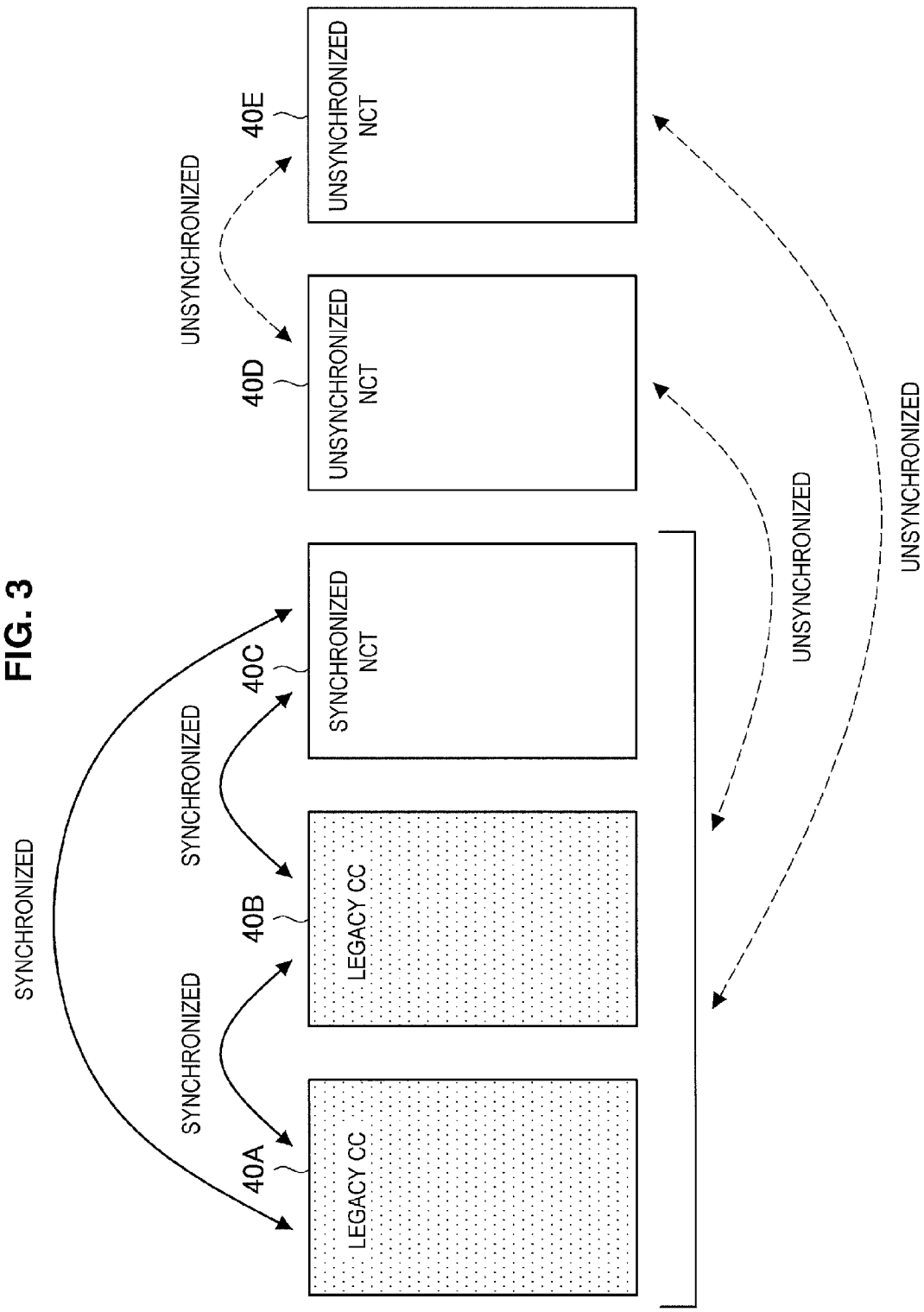
FIG. 3 is an explanatory diagram illustrating examples of NCTs.

FIG. 3 is an explanatory diagram illustrating examples of the NCTs. Five CCs 40 are illustrated in FIG. 3. Of the five CCs 40, a CC 40A and a CC 40B are legacy CCs. In this example, the CC 40A and the CC 40B are mutually synchronized. A CC 40C, a CC 40D, and a CC 40E are the NCTs. More specifically, the CC 40C is an SNCT that is synchronized with both of the CC 40A and the CC 40B which are the legacy CCs. The CC 40D and the CC 40E are UNCTs that are synchronized with neither the CC 40A nor the CC 40B. In this example, the CC 40D and the CC 40E are not mutually synchronized.

Reduction in CRSs in Unsynchronized NCT

Since the CRS transmitted in the legacy CC is transmitted not only to establish synchronization of the UE but also to demodulate a received signal, the CRS is redundant. On the other hand, since the CIS-RS is standardized as an RS for demodulation in releases after Release 10, it is possible to reduce the CRSs. Accordingly, an extent to which CRSs can be reduced while enabling the UE to continuously establish synchronization has been investigated. In particular, a reduction in the CRSs in the frequency direction and a reduction in the CRSs in the time direction have been investigated as the reduction in the CRSs of the unsynchronized NCT (that is, the UNCT).

As the reduction in the CRSs in the frequency direction, for example, the RBs in which the CRSs are transmitted is reduced to 6 RBs, 25 RBs, or 50 RBs. Hereinafter, this point will be described specifically with reference to FIG. 4.

Figure 4:
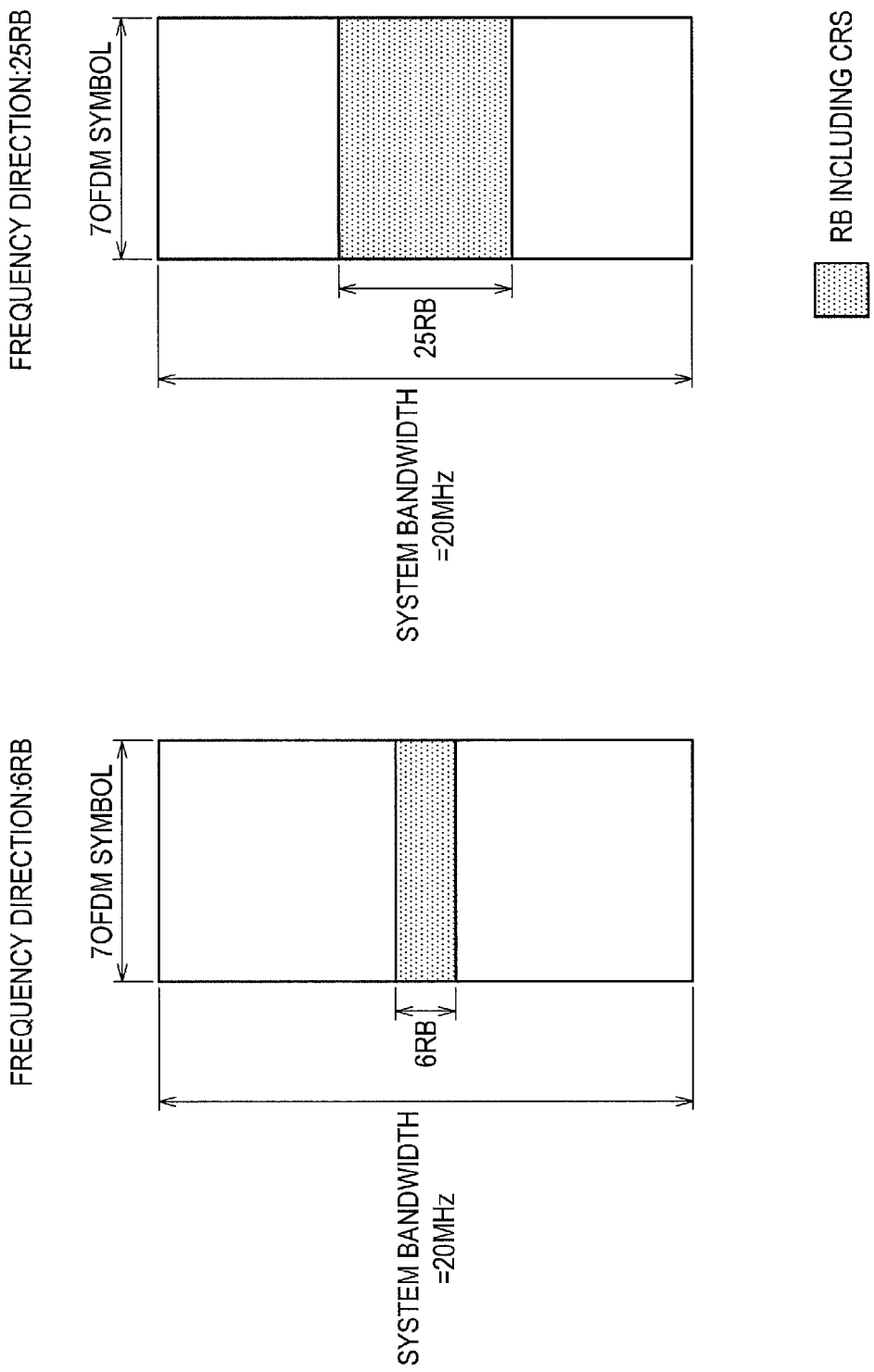
FIG. 4 is an explanatory diagram illustrating an example of a reduction in CRSs in a frequency direction.

FIG. 4 is an explanatory diagram illustrating an example of a reduction in the CRSs in the frequency direction. A case in which the RBs in which the CRSs are transmitted are reduced to 6 RBs in the frequency direction and a case in which the RBs in which the CRSs are transmitted are reduced to 25 RBs in the frequency direction are illustrated in FIG. 4. In this way, not all of the CRSs in the RBs in the frequency direction are transmitted, but the CRSs in a limited number of the RBs are transmitted.

On the other hand, as the reduction in the CRSs in the time direction, for example, a transmission period of the CRSs is considered to be 5 ms or 10 ms. This point will be described specifically with reference to FIG. 5.

Figure 5:
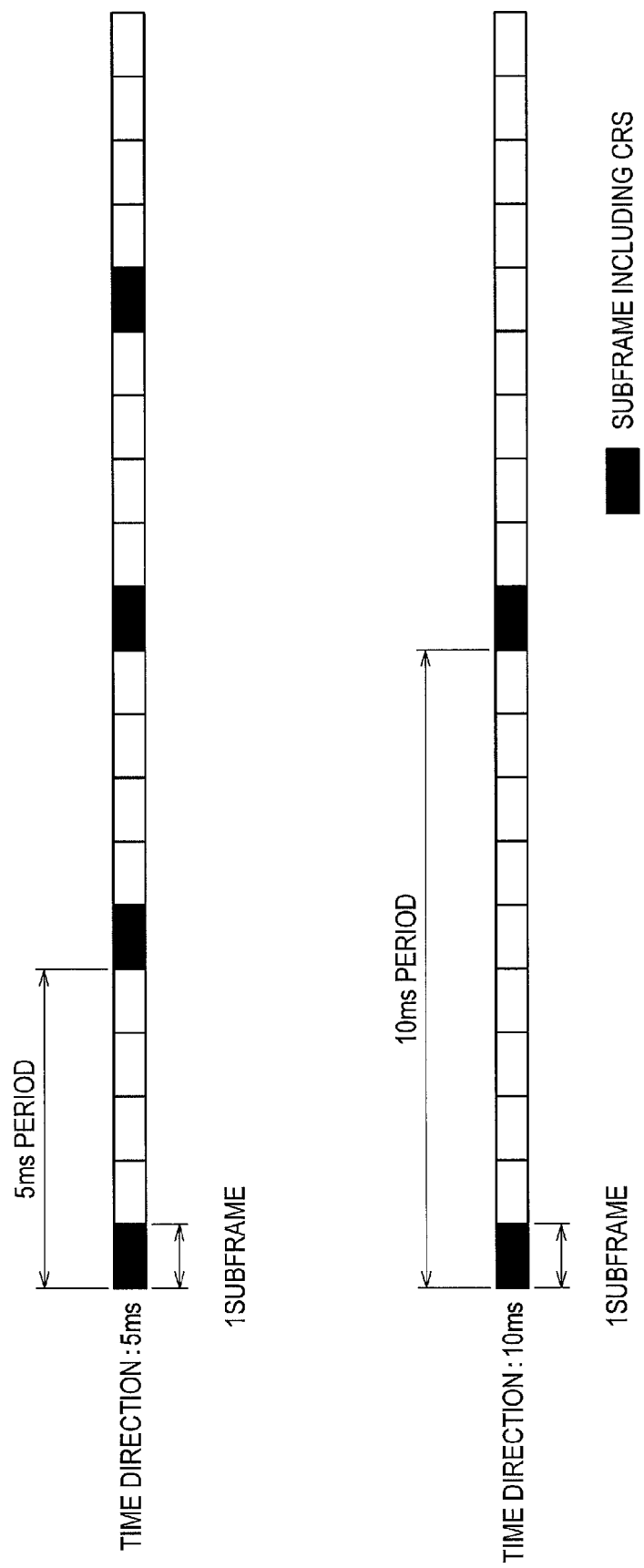
FIG. 5 is an explanatory diagram illustrating an example of a reduction in CRSs in a time direction.

FIG. 5 is an explanatory diagram illustrating an example of a reduction in the CRSs in the time direction. A case in which the transmission period of the CRS is 5 ms and a case in which the transmission period of the CRS is 10 ms are illustrated in FIG. 5. In this way, not all of the CRSs of the slots or the subframes in the time direction are transmitted, but the CRSs in a limited number of the subframes are transmitted.

As described above, a method of combining the reductions in the CRSs in the frequency direction and the reductions in the CRSs in the time direction has been investigated. As an evaluation of whether the UE establishes synchronization, whether accuracy of about 500 Hz is maintained in an environment of an SNR of −8 dB was evaluated. As a result, in the environment of an SNR of −8 dB, it is necessary to transmit the CRS in 25 RBs every 5 ms.

Reduction in CRSs in Synchronized NCT

On the other hand, since the synchronized NCT (SNCT) is synchronized with the legacy CC, the existing CRSs can be basically deleted in the SNCT.

(Synchronization Monitoring Procedure)

The UE monitors whether the UE establishes synchronization based on a block error rate (BLER) of a physical downlink control channel (PDCCH). In other words, the UE detects synchronization deviation of the UE based on the BLER of the PDCCH. For example, when the BLER of the PDCCH is equal to or greater than 10%, the UE detects the synchronization deviation.

When the synchronization deviation is detected a predetermined number of times, a timer starts. Then, when a period of time of the timer expires, radio link failure (RLF) is recognized. When the RLF is recognized, the UE stops all of the transmission within 40 ms from the recognition of the RLF in order to avoid interference with another UE. Thereafter, the UE performs a procedure of RRC reestablishment including cell selection and random access.

The UE performs the above-described synchronization monitoring on the PCC, but does not perform the synchronization monitoring on the SCC. The UE deactivates the SCC when the PDCCH is not detected in the SCC.

(NCT of Release 12)

NCT of Release 12 is a study item (SI) that was approved in September 2012 as RP-121415 at the 3GPP RAN #57 Plenary meeting. This SI is divided into phase 1 and phase 2. In phase 1, enhancement of NCT of Release 11 is scheduled to be investigated. In phase 2, the enhancement is scheduled to be investigated in consideration of scenarios of small cells. Specific examples of small cells include a pico cell, a nano cell, and a femto cell. In the present specification, the description will be made exemplifying a pico cell as the small cell.

As the scenarios of a small cell, three deployment scenarios of a small cell are considered. Such deployment scenarios are printed in TR 36.932, for example. In a first deployment scenario (that is, Deployment Scenario 1), a small cell is entirely overlapping with a macro cell. In a second deployment scenario (that is, Deployment Scenario 2), a small cell is partially overlapping with a macro cell. In a third deployment scenario (that is, Deployment Scenario 3), a small cell is not overlapping with a macro cell. That is, there is no macro cell near the small cell and only the small cell is operated. Hereinafter, specific examples of the deployment scenarios will be described with reference to FIG. 6.

Figure 6:
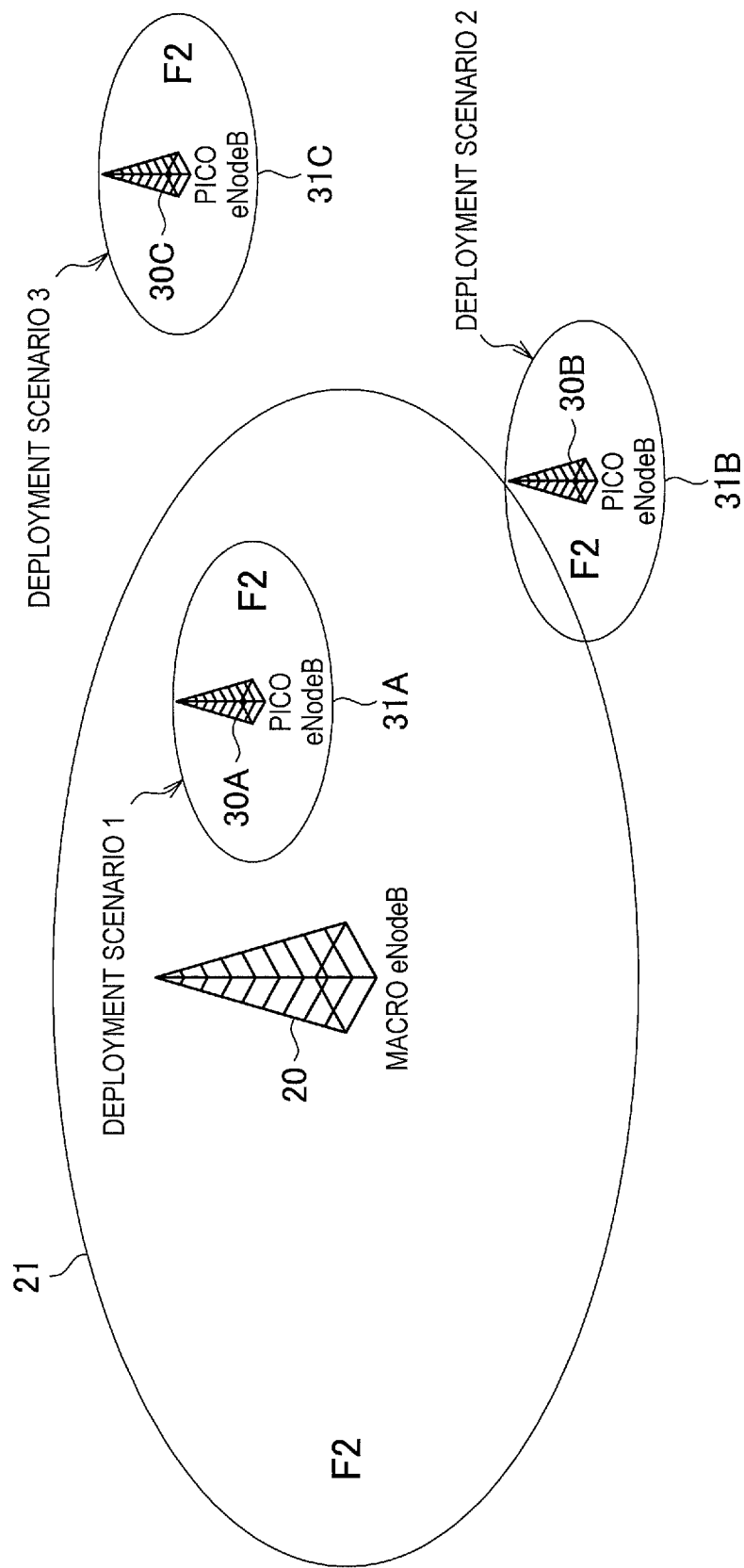
FIG. 6 is an explanatory diagram illustrating examples of three deployment scenarios of a small cell.

FIG. 6 is an explanatory diagram illustrating examples of three deployment scenarios of a small cell. Referring to FIG. 6, a macro cell 21 and three pico cells 31A, 31B, and 31C are illustrated. A macro eNodeB 20 which is a base station of the macro cell 21 and pico eNodeBs 30 which are base stations of the pico cells 311 and are also illustrated. First, the pico cell 31A is entirely overlapping with the macro cell 21, the pico cell 31B is partially overlapping with the macro cell 21, and the pico cell 31C is not overlapping with the macro cell 21. That is, the deployment of the pico cell 31A corresponds to the first deployment scenario, the deployment of the pico cell 31B corresponds to the second deployment scenario, and the deployment of the pico cell 31C corresponds to the third deployment scenario. In the example, radio communication is performed using a frequency band F1 in the macro cell 21. Further, radio communication is performed using a frequency band F2 in the pico cell 31.

(Supply Methods for Control Information to UE)

The eNodeB uses, for example, system information or radio resource control (RRC) signaling when the eNodeB supplies control information to the UE. Hereinafter, characteristics of two supply methods will be described with reference to FIG. 7.

FIG. 7 is an explanatory diagram illustrating characteristics of system information and RRC signaling. Referring to FIG. 7, there are illustrated a UE state necessary for the eNodeB to supply the control information to the UE, a supply target UE (and supplied information), and a suppliable information amount for the system information and the RRC signaling.

First, in order for the eNodeB to supply the control information with the system information, the UE may be in one of RRC_Connected (that is, a connection state) and RRC_Idle (that is, an idle state). On the other hand, in order for the eNodeB to supply the control information with the RRC signaling, the UE has to be in RRC_Connected (that is, the connection state).

Second, the control information is supplied with the system information to all of the UEs rather than an individual UE. That is, the control information supplied with the system information can be said to be information common to the UEs. On the other hand, the control information is basically supplied with the RRC signaling to the individual UE. That is, the control information supplied with the RRC signaling can be said to be basically the control information of the separate UE. However, by transmitting the control information common to other UEs with the RRC signaling, the common information can also be supplied to the UEs with the RRC signaling.

Third, the system information includes restricted control information and is transmitted using restricted radio resources. Therefore, an information amount of control information supplied with the system information is small. On the other hand, the RRC signaling is transmitted with a Physical Downlink Shared CHannel (PDSCH) relatively freely. Therefore, an information amount of control information supplied with the RRC signaling is large.

2. TECHNICAL PROBLEMS RELATED TO EMBODIMENT OF THE PRESENT DISCLOSURE

Next, technical problems related to an embodiment of the present disclosure will be described.

2.1 Examination of Synchronization Between Frequency Bands

First, examination of synchronization between frequency bands will be described.
(Synchronization Between Frequency Bands)
Here, the synchronization between frequency bands will be described more specifically. As the synchronization between the frequency bands, there are synchronization in a time direction (hereinafter referred to as "time synchronization") and synchronization in a frequency direction (hereinafter referred to as "frequency synchronization"). Hereinafter, specific examples of this point will be described with reference to FIGS. 8 and 9.

Figure 8:
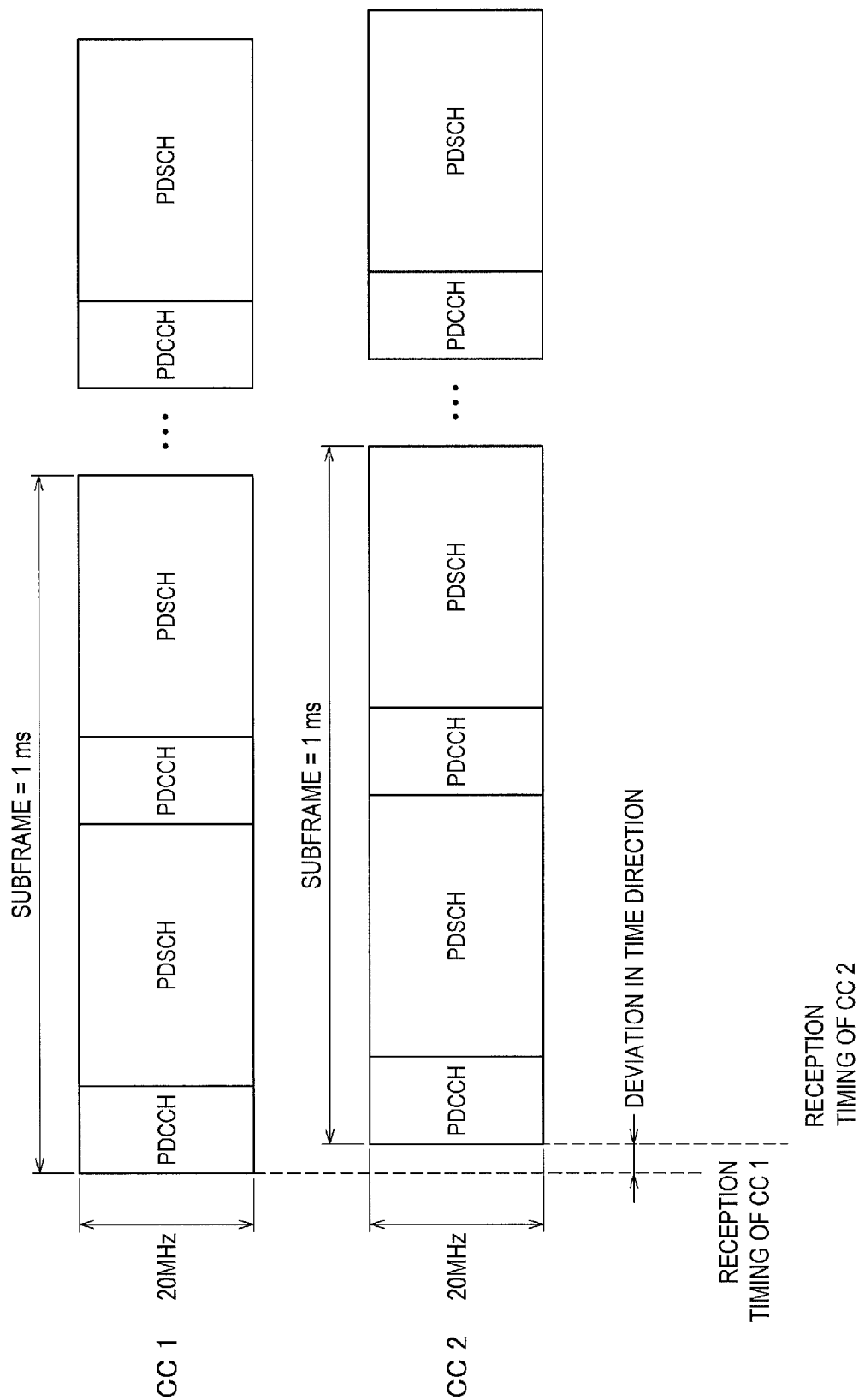
FIG. 8 is an explanatory diagram illustrating time synchronization between component carriers.

FIG. 8 is an explanatory diagram illustrating the time synchronization between component carriers. Referring to FIG. 8, there are illustrated reception timings of the CC 1 and the CC 2. For example, as in the example illustrated in FIG. 8, deviation can occur in the time direction between the reception timing of a signal with the CC 1 in the UE and the reception timing with the CC 2 in the UE. For example, when the deviation in the time direction is less than a guard interval length of the OFDM, the CC 1 and the CC 2 can be considered to be mutually synchronized in the time direction.

Figure 9:
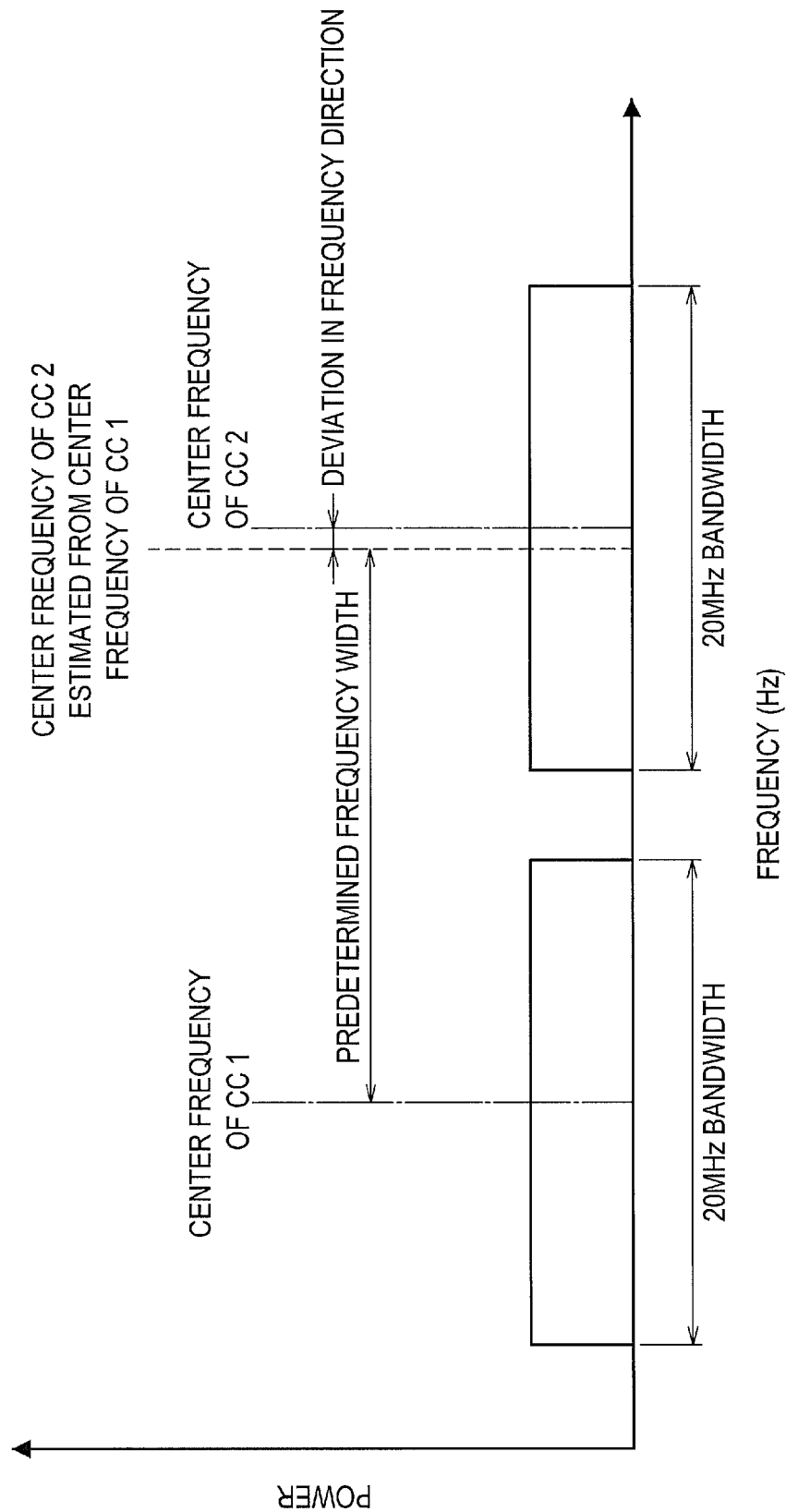
FIG. 9 is an explanatory diagram illustrating frequency synchronization between component carriers.

FIG. 9 is an explanatory diagram illustrating frequency synchronization between component carriers. Referring to FIG. 9, there are illustrated the frequency band of the CC 1 and the frequency band of the CC 2. A center frequency of the CC 1 and a center frequency of the CC 2 are also illustrated. The center frequency of the CC 1 is separated from the center frequency of the CC 2 by a predetermined frequency width. However, in practice, for example, deviation can occur in the frequency direction between the center frequency of the CC 2 and a frequency separated from the center frequency of the CC 1 by the predetermined frequency width. For example, when the deviation in the frequency direction is within a predetermined frequency width (for example, 500 Hz in Long Term Evolution (LTE)), the CC 1 and the CC 2 can be considered to be mutually synchronized in the frequency direction.

As described above, the synchronization between the frequency bands includes the time synchronization and the frequency synchronization. Therefore, there are the following four cases of the synchronization between the frequency bands:

Case 1: both the time synchronization and the frequency synchronization are achieved;
Case 2: the time synchronization is achieved, but the frequency synchronization is not achieved;
Case 3: the time synchronization is not achieved, but the frequency synchronization is achieved; and
Case 4: neither the time synchronization nor the frequency synchronization is achieved.

In general, the mutually synchronized frequency bands are the frequency bands corresponding to Case 1. However, the frequency bands corresponding to Case 2 or Case 3 may be considered to be the mutually synchronized frequency bands (in the time direction or the frequency direction).
(Synchronization on eNodeB Side and Synchronization on UE Side)

From a different viewpoint, as the synchronization between the frequency bands, there are synchronization on an eNodeB side (that is, a network side) and synchronization in a UE. Further, even when the time synchronization and the frequency synchronization are achieved for two CCs on the eNodeB side, it is not clear that the time synchronization and the frequency synchronization are achieved on the UE side when the UE receives signals in the two CCs.

For example, when the CC 1 and the CC 2 are separated in the frequency direction, a propagation path of the CC 1 and a propagation path of the CC 2 are different. As a result, arrival times of the signals may be different. In this case, the time synchronization is not achieved.

For example, a radio wave of the CC 1 and a radio wave of the CC 2 can arrive at the UE from different directions. In this case, when the UE moves in the arrival direction of the radio wave of the CC 1, the frequency of the CC 1 transitions from a frequency f to a frequency f+Δf due to the Doppler effect. Further, when the UE moves in a direction opposite to the arrival direction of the radio wave of the CC 2, the frequency band of the CC 2 transitions from a frequency f to a frequency f−Δf due to the Doppler effect. In this way, the frequency synchronization is not achieved due to the Doppler effect.

As described above, since the time synchronization and the frequency synchronization might not be achieved, it is not clear that the two CCs are mutually synchronized on the UE side even if the two CCs are synchronized on the network side.

2.2 Technical Problems

Next, technical problems will be described.
Utilization of Synchronization Result
In Release 11 of 3GPP, as described above, NCTs have been investigated as new component carriers apart from legacy CCs (existing CCs) capable of maintaining backward compatibility. Here, the NCTs are assumed to be new types of CCs and the CCs of the types. Further, an NCT (that is, SNCT) synchronized with the legacy CC and an NCT (that is, UNCT) not synchronized with the legacy LCC have been investigated as the NCTs.

Because the SNCT is synchronized with any legacy CC, when a UE establishes synchronization in one CC between the mutually synchronized SNCT and legacy CC, a synchronization result of the UE in the one CC can be utilized for the other CC. That is, the UE does not have to establish separate synchronization with a synchronization signal in the other CC. In addition, even in a case where sufficient CRSs are not transmitted in the SNCT and the UE cannot establish synchronization individually by the CRS in the SNCT, the UE can establish synchronization in the SNCT by utilizing the synchronization result in the legacy CC.

The UNCT is not synchronized with any legacy CC, but can be synchronized with different UNCTs. When the UE establishes synchronization in one CC among two or more mutually synchronized UNCTs, a synchronization result of the UE in the one CC can be utilized for the different CCs. That is, the UE does not have to establish separate synchronization with a synchronization signal in the other CCs. In addition, even in a case where sufficient CRSs are not transmitted in one of the UNCTs and the UE cannot establish synchronization individually by the CRS in the one of the UNCTs, the UE can establish synchronization in the one of the UNCTs by utilizing the synchronization result in the other UNCT.

Stability of Communication Quality of Radio Communication

However, in a case where the UE establishes synchronization by the CRS in a particular CC and establishes synchronization in another CC by utilizing the synchronization result in the particular CC, the UE may fail to establish synchronization by the CRS in the particular CC. When the UE fails to establish synchronization in the particular CC, the UE cannot utilize the synchronization result in the particular CC. As a result, when the synchronization state in the particular CC is lost, the synchronization state is lost also in the other CC. That is, the communication quality of the radio communication by the UE is damaged.

Accordingly, in a case where the UE utilizes the synchronization result in a particular CC for another CC, it is desirable to provide a mechanism that can further stabilize the communication quality of the radio communication by the UE.

3. SCHEMATIC CONFIGURATION OF COMMUNICATION SYSTEM ACCORDING TO THE PRESENT EMBODIMENT

Figure 10:
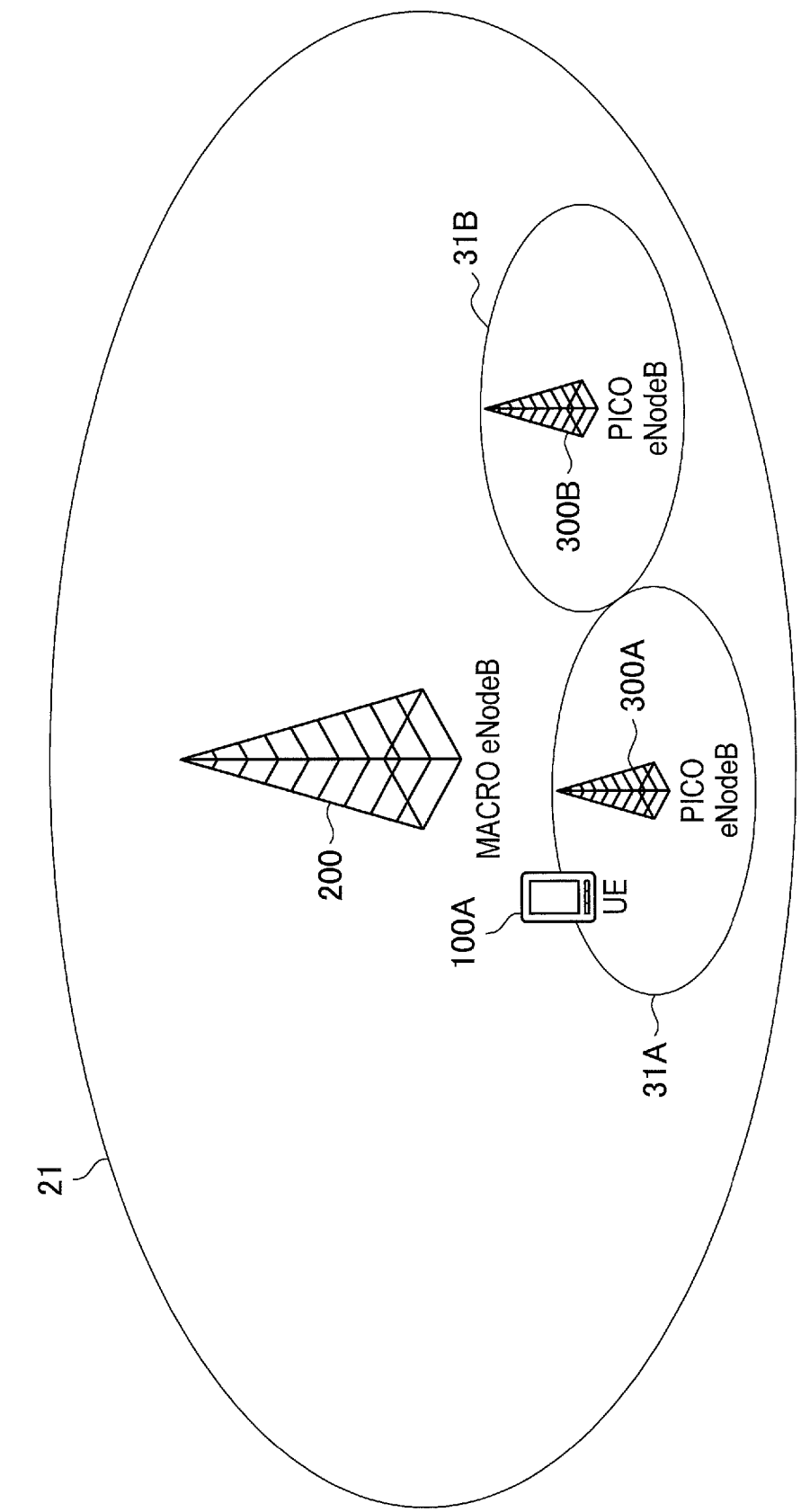
FIG. 10 is an explanatory diagram illustrating an example of a schematic configuration of a communication system according to an embodiment of the present disclosure.

Next, a schematic configuration of a communication system according to an embodiment of the present disclosure will be described with reference to FIG. 10. FIG. 10 is an explanatory diagram illustrating an example of the schematic configuration of a communication system 1 according to an embodiment of the present disclosure. Referring to FIG. 1, the communication system 1 includes a UE 100, a macro eNodeB 200, and a pico eNodeB 300. For example, the communication system 1 is a system that conforms to LTE-Advanced.

(UE 100)

The UE 100 performs radio communication with the macro eNodeB 200 within the macro cell 21. The UE 100 also performs radio communication with the pico eNodeB 300 within the pico cell 31.

In addition, the UE 100 can use a plurality of CCs at the same time for radio communication. Specifically, for example, the UE 100 can perform radio communication with the macro eNodeB 200 and/or the pico eNodeB 300 using the plurality of CCs at the same time. That is, the UE 100 supports carrier aggregation.

(Macro eNodeB 200)

The macro eNodeB 200 performs radio communication with the UE 100 located within the macro cell 21. In addition, the macro eNodeB 200 performs radio communication using one or more component carriers (CCs).

For example, each of the one or more CCs used by the macro eNodeB 200 is different from any of the one or more CCs used in the pico cell 31.

In addition, the macro eNodeB 200 transmits a synchronization signal for synchronization by the UE 100 with the one or more CCs. For example, the synchronization signal is a CRS.

Furthermore, for example, the macro eNodeB 200 performs radio communication using a plurality of CCs. The macro eNodeB 200 can use the plurality of CCs at the same time for radio communication with one UE 100. That is, the macro eNodeB 200 supports carrier aggregation.

(Pico eNodeB 300)

The pico eNodeB 300 performs radio communication with the UE 100 located within the pico cell 31 that is partially or entirely overlapping with the macro cell 21. The pico eNodeB 300 performs the radio communication using one or more CCs.

For example, each of the one or more CCs used by the pico eNodeB 300 is different from any of the one or more CCs used in a macro cell 21.

In addition, the pico eNodeB 300 transmits a synchronization signal for synchronization of the UE 100 in the one or more CCs. For example, the synchronization signal is a CRS.

Furthermore, for example, the pico eNodeB 300 performs radio communication using a plurality of CCs. The pico eNodeB 300 can use the plurality of CCs at the same time for radio communication with one UE 100. That is, the pico eNodeB 300 supports carrier aggregation.

Note that, in the present embodiment, the pico cell 31 is deployed as in a first deployment scenario (that is, Deployment Scenario 1) or a second deployment scenario (that is, Deployment Scenario 2).

4. CONFIGURATION OF UE

Figure 11:
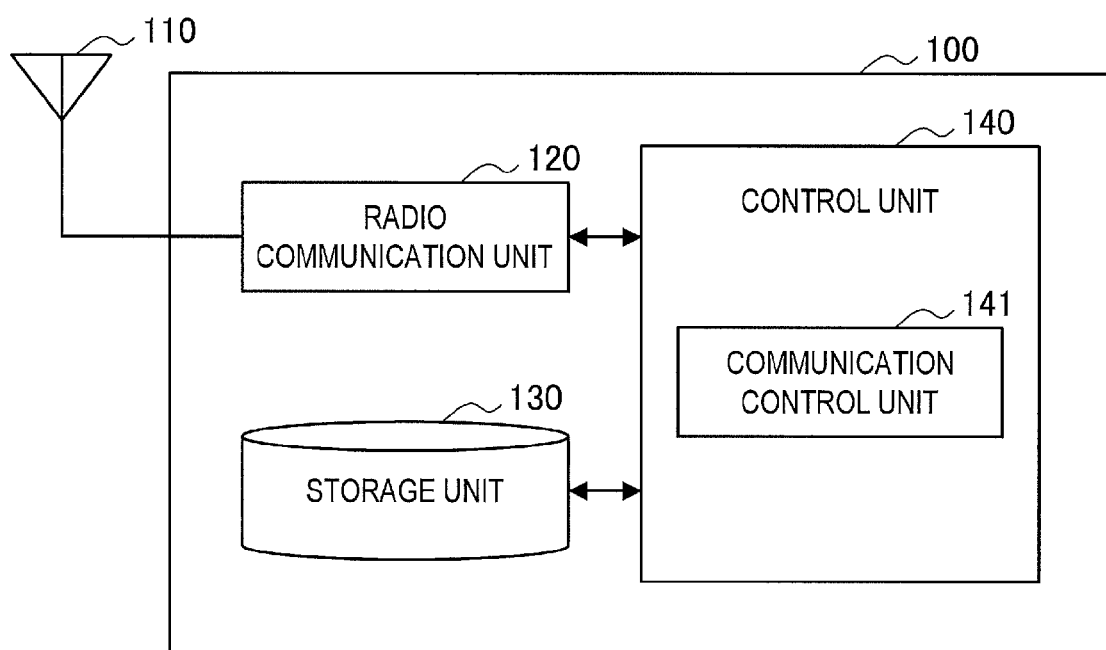
FIG. 11 is a block diagram illustrating an example of a configuration of a UE according to an embodiment.

Next, the configuration of the UE 100 according to the present embodiment will be described with reference to FIG. 11 to FIG. 19. FIG. 11 is a block diagram illustrating an example of the configuration of the UE 100 according to the present embodiment. Referring to FIG. 11, there is shown the UE 100 including an antenna unit 110, a radio communication unit 120, a storage unit 130, and a control unit 140.

(Antenna Unit 110)

The antenna unit 110 receives a radio signal and outputs the received radio signal to the radio communication unit 120. In addition, the antenna unit 110 transmits a transmission signal output by the radio communication unit 120.

(Radio Communication Unit 120)

The radio communication unit 120 performs radio communication with the macro eNodeB 200 when the UE 100 is located within the macro cell 21. In addition, the radio communication unit 120 performs radio communication with the pico eNodeB 300 when the UE 100 is located within the pico cell 31.

In addition, the radio communication unit 120 can use a plurality of CCs for radio communication at the same time. Specifically, for example, using a plurality of CCs at the same time, the radio communication unit 120 can perform radio communication with the macro eNodeB 200 and/or the pico eNodeB 300. That is, the UE 100 supports carrier aggregation.

Furthermore, for example, the radio communication unit 120 establishes synchronization in the CC by the synchronization signal transmitted in the CC. As described above, for example, the synchronization signal is a CRS.

(Storage Unit 130)

The storage unit 130 stores a program and data for an operation of the UE 100.

(Control Unit 140)

The control unit 140 provides a variety of functions of the UE 100.

The control unit 140 includes a communication control unit 141.

(Communication Control Unit 141)

The communication control unit 141 controls radio communication performed by the UE 100.

Utilization of Synchronization Result

In particular, in the present embodiment, the communication control unit 141 establishes synchronization in a second component carrier (CC) (hereinafter referred to as "CC 2") that is synchronized with a first CC (hereinafter referred to as "CC 1") by a synchronization signal transmitted in the CC 2, and controls a radio communication function so as to establish synchronization in the CC 1 by utilizing the synchronization result in the CC 2.

For example, the synchronization signal is a CRS. Further, for example, the radio communication function is the radio communication unit 120. That is, the communication control unit 141 establishes synchronization in the CC 2 by the CRS transmitted in the CC2, and controls the radio communication unit 120 so as to establish synchronization in the CC 1 by utilizing the synchronization result in the CC 2.

Switching of CC (Primary Anchor Point) on the Supply Side of Synchronization Result Furthermore, in particular, in the present embodiment, the CC 1 is also synchronized with a third CC (hereinafter referred to as "CC 3"). The communication control unit 141 controls the radio communication function so as to establish synchronization in the CC 3 by the synchronization signal transmitted in the CC3 before the radio communication function becomes unable to establish synchronization in the CC2 by the synchronization signal, and to establish synchronization in the CC 1 by utilizing the synchronization result in the CC 3.

For example, the communication control unit 141 controls the radio communication unit 120 so as to establish synchronization in the CC 3 by the CRS transmitted in the CC3 before the radio communication unit 120 becomes unable to establish synchronization in the CC 2, and to establish synchronization in the CC 1 by utilizing the synchronization result in the CC 3. That is, the CC on the supply side of the synchronization result is switched from the CC 2 to the CC 3.

In the present specification, the CC on the supply side of the synchronization result at that time, such as the CC 2 before switching or the CC1 after switching, is referred to as "primary anchor point". In addition, the CC as a candidate for the next primary anchor point, such as the CC 3 after switching, is referred to as "secondary anchor point". Further, the CC on the supply side of the synchronization result and the candidate therefor is also simply referred to as "anchor point". Furthermore, the CC on the utilization side of the synchronization result, such as the CC 1, is referred to as "slave". An example of switching of the primary anchor point will be described below with reference to FIG. 12A and FIG. 12B.

Figure 12A:
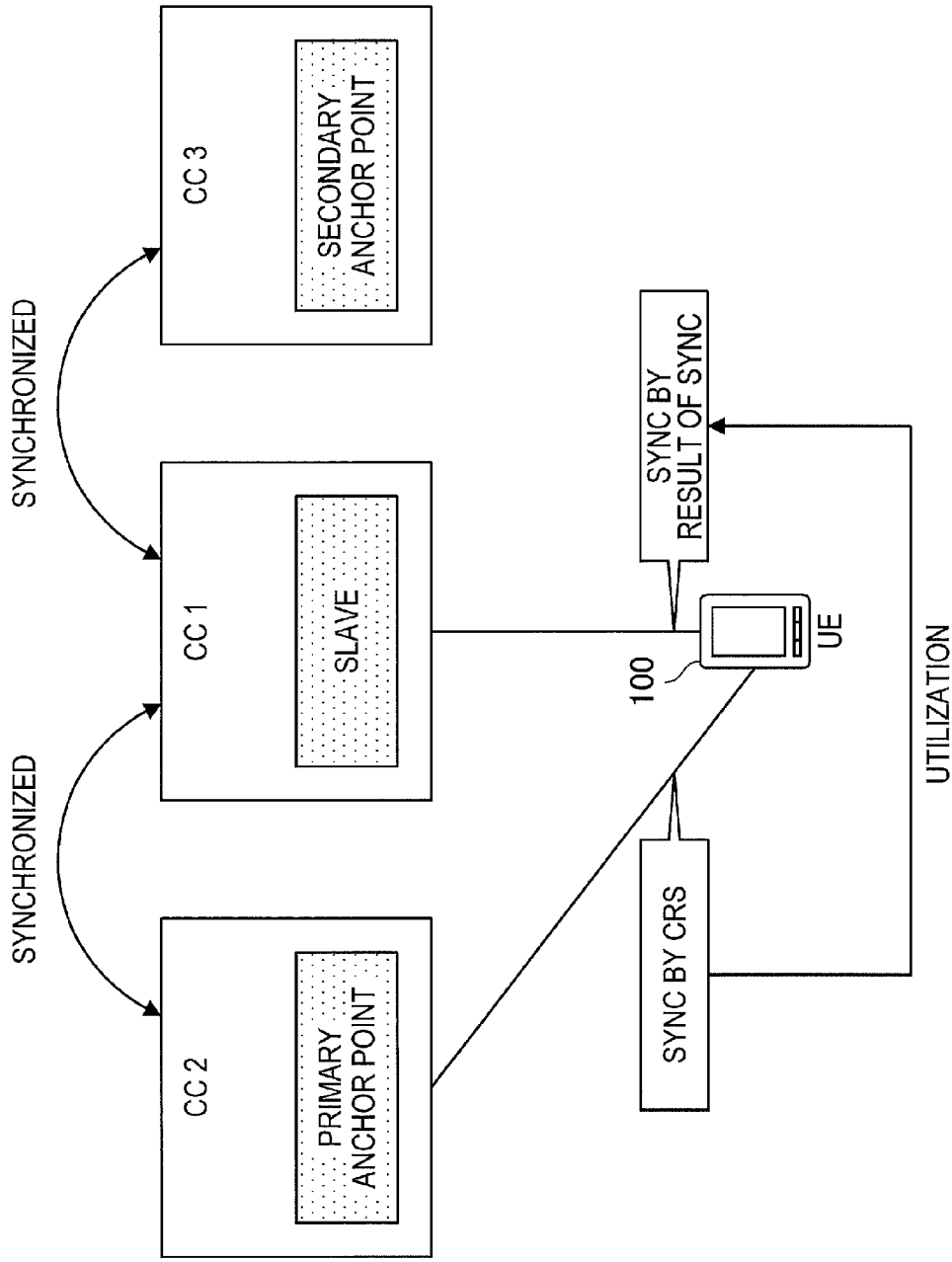
FIG. 12A is an explanatory diagram illustrating an example of a state before switching of a primary anchor point.

FIG. 12A is an explanatory diagram illustrating an example of a state before switching of the primary anchor point. Referring to FIG. 12A, there are shown the CC 2 and the CC 3 each of which is synchronized with the CC 1. In this example, the UE 100 establishes synchronization by the CRS in the CC 2, and establishes synchronization in the CC 1 by utilizing the synchronization result in the CC 2. That is, in this example, the CC 1 serves as the slave and the CC 2 serves as the primary anchor point. Further, the CC 3 serves as a candidate for the next primary anchor point. That is, the CC 3 serves as the secondary anchor point. For example, at any timing after that, the UE 100 becomes unable to establish synchronization by the CRS in the CC 2 serving as the primary anchor point; before that, the UE 100 switches the primary anchor point from the CC 2 to the CC 3.

FIG. 12B is an explanatory diagram illustrating an example of a state after switching of the primary anchor point. Referring to FIG. 12B, as in FIG. 12A, there are shown the CC 2 and the CC 3 each of which is synchronized with the CC 1. In this example, the UE 100 switches the primary anchor point from the CC 2 to the CC 3. That is, the CC 3 serves as the new primary anchor point. Accordingly, the UE 100 establishes synchronization in the CC3 by the CRS, and establishes synchronization in the CC1 by utilizing the synchronization result in the CC 3. Note that, as in this example, the CC 2 that has served as the primary anchor point, for example, serves as the secondary anchor point after switching.

In the above manner, the CC on the supply side of the synchronization result is switched. That is, the primary anchor point is switched. Thus, it becomes possible to further stabilize the communication quality of the radio communication by the UE.

More specifically, since the primary anchor point is switched from the CC 2 to the CC 3 before the UE 100 becomes unable to establish synchronization in the CC 2, even after the UE 100 becomes unable to establish synchronization in the CC 2 by the CRS, the UE 100 can continue to establish synchronization in the CC 3 by the CRS. Accordingly, by utilizing the synchronization result in the primary anchor point, the UE 100 can continue to establish synchronization also in the slave (CC 1). As a result, it becomes possible to further stabilize the communication quality of the radio communication by the UE 100.

Timing of Switching of Primary Anchor Point

In addition, for example, in a case where the accuracy of synchronization in the CC 2 satisfies predetermined switching conditions, the communication control unit 141 controls the radio communication function so as to establish synchronization in the CC 3 and to establish synchronization in the CC 1 by utilizing the synchronization result in the CC 3.

For example, in a case where the accuracy of synchronization in the CC 2 satisfies the predetermined switching conditions, the communication control unit 141 switches the primary anchor point from the CC 2 to the CC 3. As a result, the radio communication unit 120 establishes synchronization in the CC 3 by the CRS, and establishes synchronization in the CC 1 by utilizing the synchronization result in the CC 3.

Thus, it becomes possible to further stabilize the communication quality of the radio communication by the UE 100 in the slave (the CC 1). Specific examples of the predetermined switching conditions will be described below.

First Example of Switching Conditions

As a first example, the predetermined switching conditions include the accuracy of synchronization in the CC 2 being lower than the accuracy of synchronization in the CC 3. In this case, for example, in a case where the accuracy of synchronization in the CC 2 is lower than the accuracy of synchronization in the CC 3, the communication control unit 141 switches the primary anchor point from the CC 2 to the CC 3.

More specifically, for example, the communication control unit 141 establishes synchronization by the CRS in both the CC 2 serving as the primary anchor point and the CC 3 serving as the secondary anchor point, and monitors the accuracy of synchronization in each of the CC 2 and the CC 3. As an example, the communication control unit 141 monitors the accuracy of synchronization by the BLER of the PDCCH. That is, in a case where the BLER of the PDCCH is low, the communication control unit 141 determines that the accuracy of synchronization is high; in a case where the BLER of the PDCCH is high, the communication control unit 141 determines that the accuracy of synchronization is low. Further, in a case where the accuracy of synchronization in the CC 2 is lower than the accuracy of synchronization in the CC 3, that is, in a case where the BLER of the PDCCH in the CC 2 is higher than the BLER of the PDCCH in the CC 3, the communication control unit 141 switches the primary anchor point from the CC 2 to the CC 3.

Thus, the UE 100 can establish synchronization with a higher accuracy in the slave (the CC 1). As a result, the communication quality of the radio communication by the UE 100 in the slave (the CC 1) becomes more stable.

Second Example of Switching Conditions

As a second example, the predetermined switching conditions may include the accuracy of synchronization in the CC 2 being lower than a predetermined accuracy. In this case, for example, in a case where the accuracy of synchronization in the CC 2 is lower than the predetermined accuracy, the communication control unit 141 may switch the primary anchor point from the CC 2 to the CC 3.

More specifically, for example, the communication control unit 141 establishes synchronization by the CRS in the CC 2 serving as the primary anchor point, and monitors the accuracy of synchronization in the CC 2. As described above, as an example, the communication control unit 141 monitors the accuracy of synchronization by the BLER of the PDCCH. In a case where the accuracy of synchronization in the CC 2 is lower than the predetermined accuracy, that is, in a case where the BLER of the PDCCH in the CC 2 is higher than a predetermined BLER (for example, 1%), the communication control unit 141 switches the primary anchor point from the CC 2 to the CC 3.

Thus, the UE 100 can establish synchronization in the slave (the CC 1) with an accuracy of a certain level or higher. As a result, the communication quality of the radio communication by the UE 100 in the slave (the CC 1) becomes more stable. In addition, since the acquisition of synchronization and the target of monitoring are limited to the primary anchor point, the load on the UE 100 can be more reduced.

Type of Each CC

For example, the CC 1 is a CC in which the synchronization signal is not transmitted in at least any subframe among subframes each of which is a unit of time in the radio communication. For example, the CC 1 is a CC in which the CRS is not transmitted in any subframe. That is, the CC 1 is a NCT.

Further, for example, the number of synchronization signals transmitted in the CC 1 is smaller than the number of synchronization signals transmitted in each of the CC 2 and the CC 3. For example, the number of CRSs transmitted in the CC 1 is smaller than the number of CRSs transmitted in each of the CC 2 and the CC 3. In such a case, the UE 100 can establish synchronization with a higher accuracy in the CC 1 by establishing synchronization in the CC 1 by utilizing the synchronization result by the CRS in the primary anchor point (the CC 2 or the CC 3) instead of establishing synchronization individually in the CC 1 by the CRS. As a result, the communication quality of the radio communication by the UE 100 in the CC 1 becomes more stable.

Further, for example, the number of synchronization signals transmitted in the CC 1 is smaller than the number of synchronization signals required for synchronization in the CC 1. For example, the number of CRSs transmitted in the CC 1 is smaller than the number of CRSs required for synchronization in the CC 1. In this case, the UE 100 cannot establish synchronization individually in the CC 1 by the CRS, but can establish synchronization in the CC 1 by utilizing the synchronization result by the CRS in the primary anchor point (the CC 2 or the CC 3).

Cell Using Each CC

Cell Using Slave

For example, the CC 1 serving as the slave is a CC used in the pico cell 31.

Since the pico cell 31 is a narrow area, due to the movement of the UE 100, it may become difficult to establish synchronization by the CRS in the CC used in the pico cell 31. That is, in a case where the UE 100 moves, the communication quality of the radio communication in the CC used in the pico cell 31 is less likely to be stable. However, as described above, by utilizing the synchronization result in the anchor point for the CC (that is, the slave) of the pico cell 31, the accuracy of synchronization in the CC used in the pico cell 31 may be increased. As a result, the communication quality of the radio communication by the UE 100 in the CC 1 may become more stable.

In addition, when a synchronization result in another CC is utilized for the CC used in the pico cell 31, it becomes possible not to transmit a CRS in the pico cell 31 or to reduce the amount of CRSs transmitted in the pico cell 31. As a result, it becomes possible to increase the throughput in the pico cell 31.

Cell Using Anchor Point

There may be various cases for the primary anchor point and the secondary anchor point (that is, the CC 2 and the CC 3) with respect to the slave, as shown below:

Case 1: CCs are used in the same cell (pico cell);
Case 2: CCs are used in the same cell (macro cell);
Case 3: a CC is used in one of mutually adjacent cells (pico cells) and a CC is used in the other;
Case 4: a CC is used in one of mutually adjacent cells (macro cells) and a CC is used in the other; and
Case 5: a CC is used in the macro cell and a CC is used in the pico cell.

CCs Used in the Same Cell (Cases 1 and 2)

For example, the CC 2 and the CC 3 are CCs used in the same cell.

Specifically, as a first example, the CC 2 and the CC 3 are CCs used in the same pico cell 31. This corresponds to Case 1 above. This point will be shown below by taking a specific example with reference to FIG. 13.

FIG. 13 is an explanatory diagram illustrating an example of Case 1 in which the primary anchor point and the secondary anchor point are CCs used in the same pico cell 31. Referring to FIG. 13, there are shown, as in FIG. 10, the UE 100, the macro eNodeB 200 of the macro cell 21, and the pico eNodeB 300 of the pico cell 31. Further, there are shown the CC 1 serving as the slave, the CC 2 serving as the primary anchor point, and the CC 3 serving as the secondary anchor point. In this example, both the CC 2 and the CC 3 are CCs used in the pico cell 31A. In addition, for example, the CC 1 is a CC used in the pico cell 31A. The UE 100 switches the primary anchor point from the CC 2 of the pico cell 31A to the CC 3 of the pico cell 31A before becoming unable to establish synchronization by the CRS in the CC 2 of the pico cell 31A.

As a second example, the CC 2 and the CC 3 are CCs used in the same macro cell 21. This corresponds to Case 2. This point will be described below by taking a specific example with reference to FIG. 14.

FIG. 14 is an explanatory diagram illustrating an example of Case 2 in which the primary anchor point and the secondary anchor point are CCs used in the same macro cell 21. Referring to FIG. 14, in this example, both the CC 2 and the CC 3 are CCs used in the macro cell 21. In addition, for example, the CC 1 is a CC used in the pico cell 31A. The UE 100 switches the primary anchor point from the CC 2 of the macro cell 21 to the CC 3 of the macro cell 21 before becoming unable to establish synchronization by the CRS in the CC 2 of the macro cell 21.

As in the above described Case 1 and Case 2, the CC 2 and the CC 3 may be CCs used in the same cell. In this manner, even when the CC 2 and the CC 3 are CCs used in the same cell, since the frequency band of the CC 2 and the frequency band of the CC 3 are different from each other, the area receiving radio waves in the CC 2 and the area receiving radio waves in the CC 3 may be different from each other. Accordingly, the UE 100 can establish synchronization by the CRS in the CC 3 serving as the secondary anchor point even in an area in which it is difficult to establish synchronization by the CRS in the CC 2 serving as the primary anchor point. Thus, the UE 100 can use the CCs used in the same cell as the primary anchor point and the secondary anchor point, enabling the communication quality of the radio communication by the UE 100 to be more stable. Therefore, even in a case where CCs used in different cells are not mutually synchronized or where the UE 100 is unable to receive signals of different cells, for example, the UE 100 uses the mutually synchronized CCs of the same cell as anchor points, enabling the communication quality in the CC 1 to be more stable.

CCs Used in Mutually Adjacent Cells (Cases 3 and 4)

For example, the CC 2 and the CC 3 are CCs used in different cells. Further, for example, the CC 2 is a CC used in a first cell, and the CC 3 is a CC used in a second cell that is adjacent to the first cell.

Specifically, as a first example, the CC 2 is a CC used in a first pico cell 31, and the CC 3 is a CC used in a second pico cell 31 that is adjacent to the first pico cell 31. This corresponds to Case 3 above. This point will be described below by taking a specific example with reference to FIG. 15.

Figure 15:
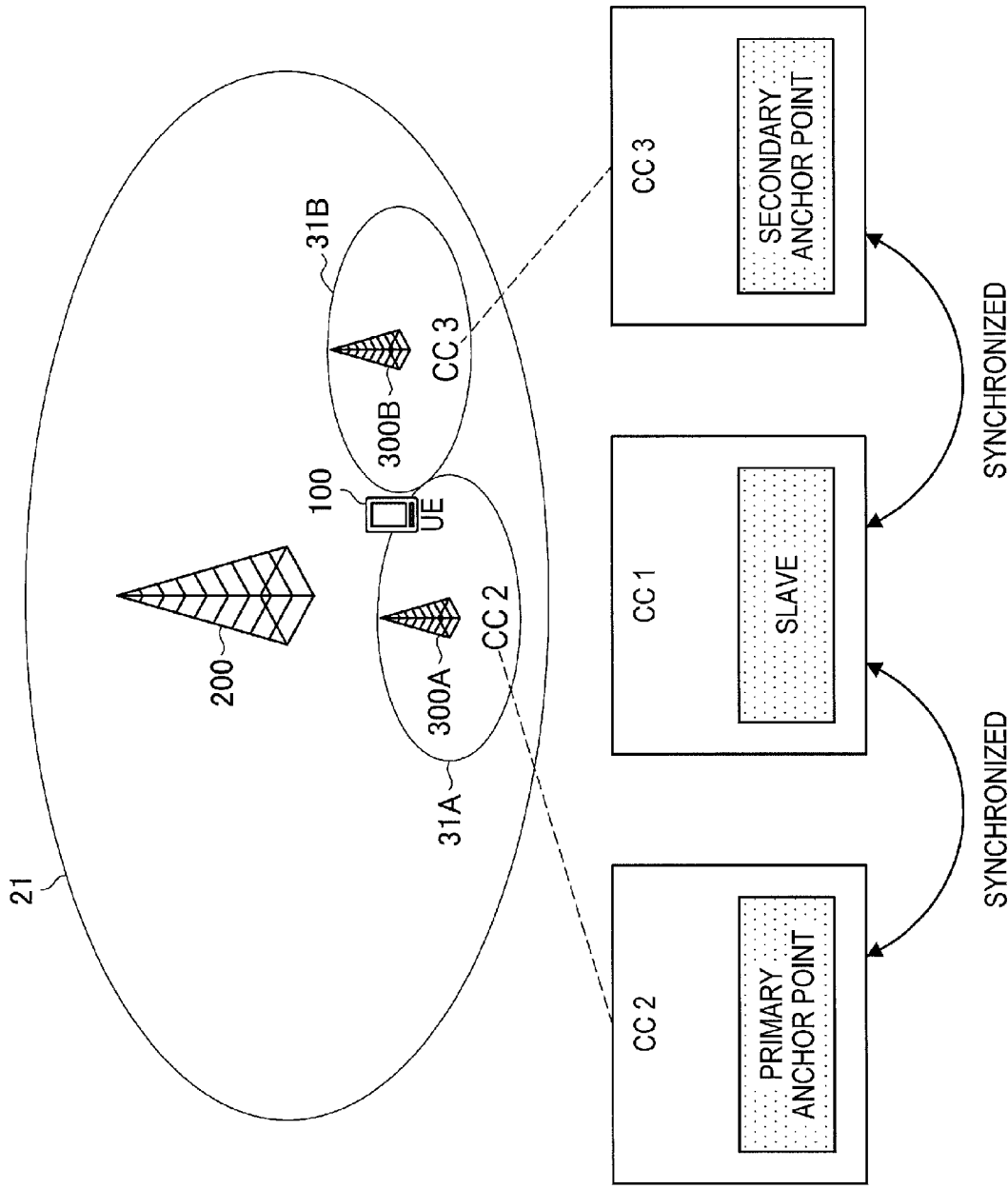
FIG. 15 is an explanatory diagram illustrating an example of Case 3 in which a primary anchor point is a CC used in a first pico cell and a secondary anchor point is a CC used in a second pico cell.

FIG. 15 is an explanatory diagram illustrating an example of Case 3 in which the primary anchor point is a CC used in the first pico cell 31 and the secondary anchor point is a CC used in the second pico cell 31. Referring to FIG. 15, in this example, the CC 2 is a CC used in the pico cell 31A, and the CC 3 is a CC used in the pico cell 31B. Further, for example, the CC 1 is a CC used in the pico cell 31A. The UE 100 switches the primary anchor point from the CC 2 of the pico cell 31A to the CC 3 of the pico cell 31B before becoming unable to establish synchronization by the CRS in the CC 2 of the pico cell 31A.

As a second example, the CC 2 is a CC used in a first macro cell 21, and the CC 3 is a CC used in a second macro cell 21 that is adjacent to the first macro cell 21. This corresponds to Case 4 above. This point will be described below by taking a specific example with reference to FIG. 16.

Figure 16:
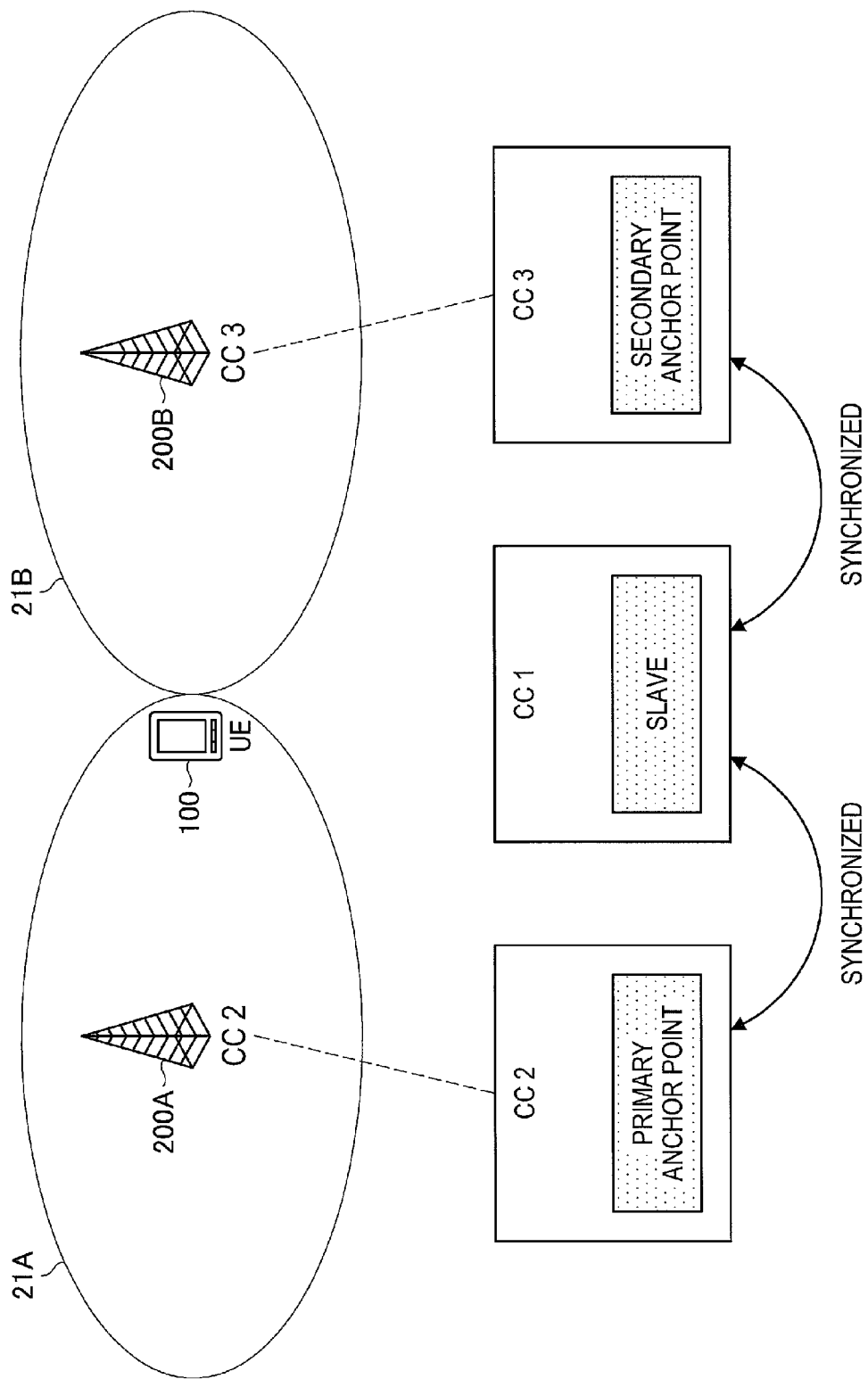
FIG. 16 is an explanatory diagram illustrating an example of Case 4 in which a primary anchor point is a CC used in a first macro cell and a secondary anchor point is a CC used in a second macro cell.

FIG. 16 is an explanatory diagram illustrating an example of Case 4 in which the primary anchor point is a CC used in the first macro cell 21 and the secondary anchor point is a CC used in the second macro cell 21. Referring to FIG. 16, there are shown the UE 100, a macro eNodeB 200A of a macro cell 21A, and a macro eNodeB 200B of a macro cell 21B. In this example, the CC 2 is a CC used in the macro cell 21A, and the CC 3 is a CC used in the macro cell 21B. Further, for example, the CC 1 is a CC used in the pico cell 31 (not illustrated). The UE 100 switches the primary anchor point from the CC 2 of the macro cell 21A to the CC 3 of the macro cell 21B before becoming unable to establish synchronization by the CRS in the CC 2 of the macro cell 21A.

As in Case 3 and Case 4 described above, the CC 2 may be a CC used in a particular cell, and the CC 3 may be a CC used in another cell. In such a case, for example, when the UE 100 is located near the boundary between the cell using the CC 2 and the cell using the CC 3, it is difficult to establish synchronization by the CRS in the CC 2 serving as the primary anchor point, but it is possible to establish synchronization by the CRS in the CC 3 serving as the secondary anchor point. Accordingly, since the CC used in a first cell and the CC used in a second cell that is adjacent to the first cell serve as the anchor points, even in a case where the UE 100 is located near the cell edge, the communication quality in the CC 1 can be more stable.

CC Used in Macro Cell and CC Used in Pico Cell (Case 5)

For example, the CC 2 and the CC 3 are CCs used in different cells. Furthermore, for example, the CC 2 is one CC of the CC used in the pico cell 31 and the CC used in the macro cell 21. In addition, the CC 3 is the other CC of the CC used in the pico cell 31 and the CC used in the macro cell 21. This corresponds to Case 5 above.

Specifically, as a first example, the CC 2 is a CC used in the pico cell 31, and the CC 3 is a CC used in the macro cell 21. This point will be described below by taking a specific example with reference to FIG. 17.

Figure 17:
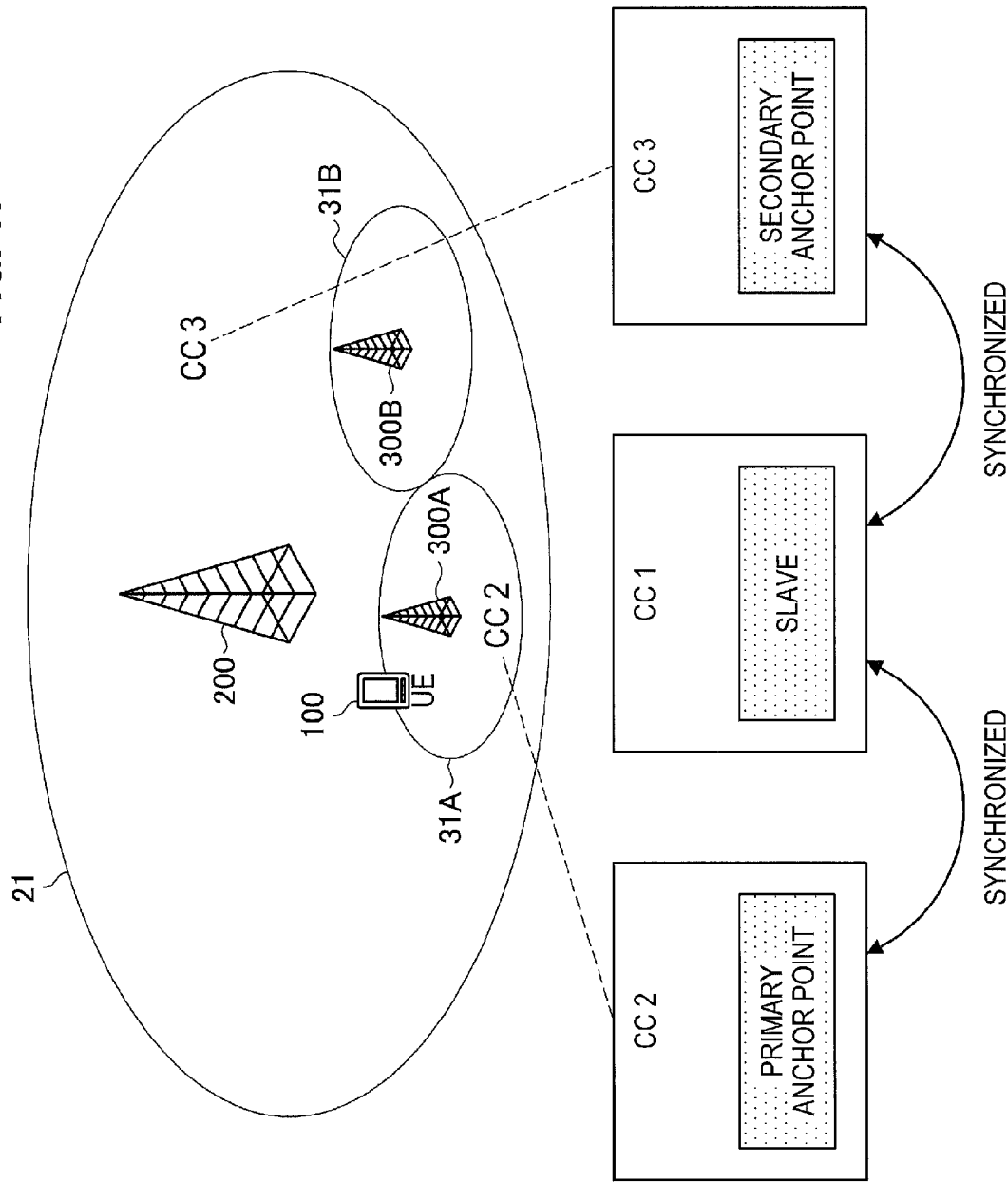
FIG. 17 is an explanatory diagram illustrating a first example of Case 5 in which a primary anchor point is a CC used in a pico cell and a secondary anchor point is a CC used in a macro cell.

FIG. 17 is an explanatory diagram illustrating a first example of Case 5 in which the primary anchor point is a CC used in the pico cell 31 and the secondary anchor point is a CC used in the macro cell 21. Referring to FIG. 17, in this example, the CC 2 is a CC used in the pico cell 31A, and the CC 3 is a CC used in the macro cell 21. Further, for example, the CC 1 is a CC used in the pico cell 31A. The UE 100 switches the primary anchor point from the CC 2 of the pico cell 31 to the CC 3 of the macro cell 21 before becoming unable to establish synchronization by the CRS in the CC 2 of the pico cell 31.

Even when the UE 100 moves to be near the cell edge of the pico cell 31 and it becomes difficult to establish synchronization in the primary anchor point (the CC of the pico cell 31), such switching causes the CC of the macro cell 21 to serve as the primary anchor point. Accordingly, the UE 100 can establish synchronization in the new primary anchor point with a high possibility. Thus, the communication quality of the radio communication by the UE 100 in the CC 1 can be more stable.

As a second example, the CC 2 is a CC used in the macro cell 21, and the CC 3 is a CC used in the pico cell 31. This point will be described below by taking a specific example with reference to FIG. 18.

Figure 18:
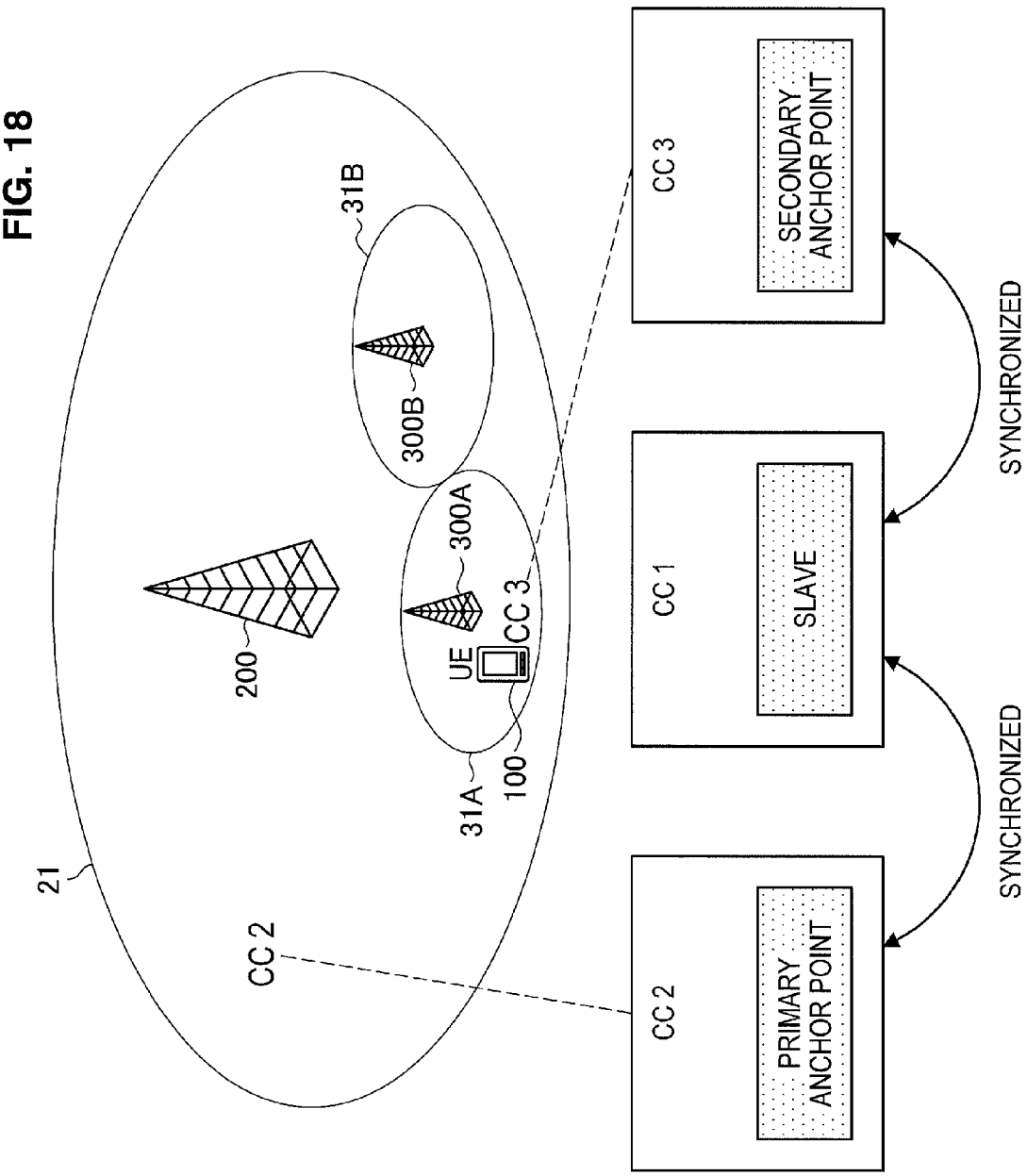
FIG. 18 is an explanatory diagram illustrating a first example of Case 5 in which a primary anchor point is a CC used in a macro cell and a secondary anchor point is a CC used in a pico cell.

FIG. 18 is an explanatory diagram illustrating a first example of Case 5 in which the primary anchor point is a CC used in the macro cell 21 and the secondary anchor point is a CC used in the pico cell 31. Referring to FIG. 18, in this example, the CC 2 is a CC used in the macro cell 21, and the CC 3 is a CC used in the pico cell 31A. Further, for example, the CC 1 is a CC used in the pico cell 31A. The UE 100 switches the primary anchor point from the CC 2 of the macro cell 21 to the CC 3 of the pico cell 31 before becoming unable to establish synchronization by the CRS in the CC 2 of the macro cell 21.

Even when the UE 100 moves to be near the cell edge of the macro cell 21 and it becomes difficult to establish synchronization in the primary anchor point (the CC of the macro cell 21), such switching causes the CC of the pico cell 31 (located near the cell edge, for example) to be the primary anchor point. Accordingly, the UE 100 can establish synchronization in the new primary anchor point. Thus, the communication quality of the radio communication by the UE 100 in the CC 1 can be more stable.

Search for New Anchor Point

Further, for example, in a case where predetermined search conditions are satisfied, the communication control unit 141 searches for another CC, other than the CC 2 and CC 3, which is synchronized with the CC 1. That is, the communication control unit 141 searches for a candidate for a new anchor point.

As a first example, the predetermined search conditions include the accuracy of synchronization in the secondary anchor point being lower than a predetermined accuracy. That is, in a case where the accuracy of synchronization in the secondary anchor point (the CC 3) is lower than the predetermined accuracy, the communication control unit 141 searches for another CC that is synchronized with the slave (the CC 1).

Specifically, for example, the communication control unit 141 establishes synchronization by the CRS in the CC 3 serving as the secondary anchor point, and monitors the accuracy of synchronization in the CC 3. As described above, as an example, the communication control unit 141 monitors the accuracy of synchronization by the BLER of the PDCCH. In a case where the accuracy of synchronization in the CC 3 is lower than the predetermined accuracy, that is, in a case where the BLER of the PDCCH in the CC 3 is higher than a predetermined BLER (for example, 1%), the communication control unit 141 searches for another CC synchronized with the CC 1.

As a second example, the predetermined search conditions may include the switching of the primary anchor point. That is, in a case where the primary anchor point is switched from the CC 2 to the CC 3, the communication control unit 141 may search for another CC that is synchronized with the slave (the CC 1).

Note that, for example, in a case where a fourth CC (hereinafter referred to as "CC4") is found as the other CC, the communication control unit 141 controls the radio communication function so as to establish synchronization in the CC 4 by a synchronization signal transmitted in the CC 4, instead of establishing synchronization in the CC 3, before becoming unable to establish synchronization in the CC 2 by the synchronization signal transmitted by the radio communication function in the CC 2, and to establish synchronization in the CC 1 by utilizing the synchronization result in the CC 4. That is, in a case where the CC 4 is found, the communication control unit 141 switches the secondary anchor point to the CC 4.

In the above manner, the other CC that is synchronized with the slave (the CC 1) is found. Thus, even in a case where a sufficient accuracy of synchronization is not obtained in the secondary anchor point, the new secondary anchor point can be obtained. As a result, it becomes possible to stabilize the communication quality of the radio communication by the UE 100 continuously.

Suspension of Use of Slave

For example, in a case where predetermined ending conditions are satisfied, the communication control unit 141 suspends the use of the CC 1. The predetermined ending conditions include the accuracy of synchronization in each CC synchronized with the CC 1 being lower than predetermined accuracy.

For example, in a case where the accuracy of synchronization in each CC synchronized with the slave (the CC 1) is lower than the predetermined accuracy, the communication control unit 141 suspends the use of the slave (the CC 1).

Thus, in a case where it is difficult to utilize the synchronization result, the use of the slave is suspended. As a result, the generation of a communication error can be suppressed.

In a case where CRSs enough to establish synchronization in the CC 1 are transmitted, the communication control unit 141 may control the radio communication unit 120 so as to establish synchronization individually by the CRS in the slave, instead of suspending the use of the slave (the CC 1).

Utilization Method of Anchor Point

For example, the communication control unit 141 does not allow the UE 100 to be connected in a radio resource in at least one CC of the CC 2 and the CC 3. This point will be described below by taking a specific example with reference to FIG. 19.

Figure 19:
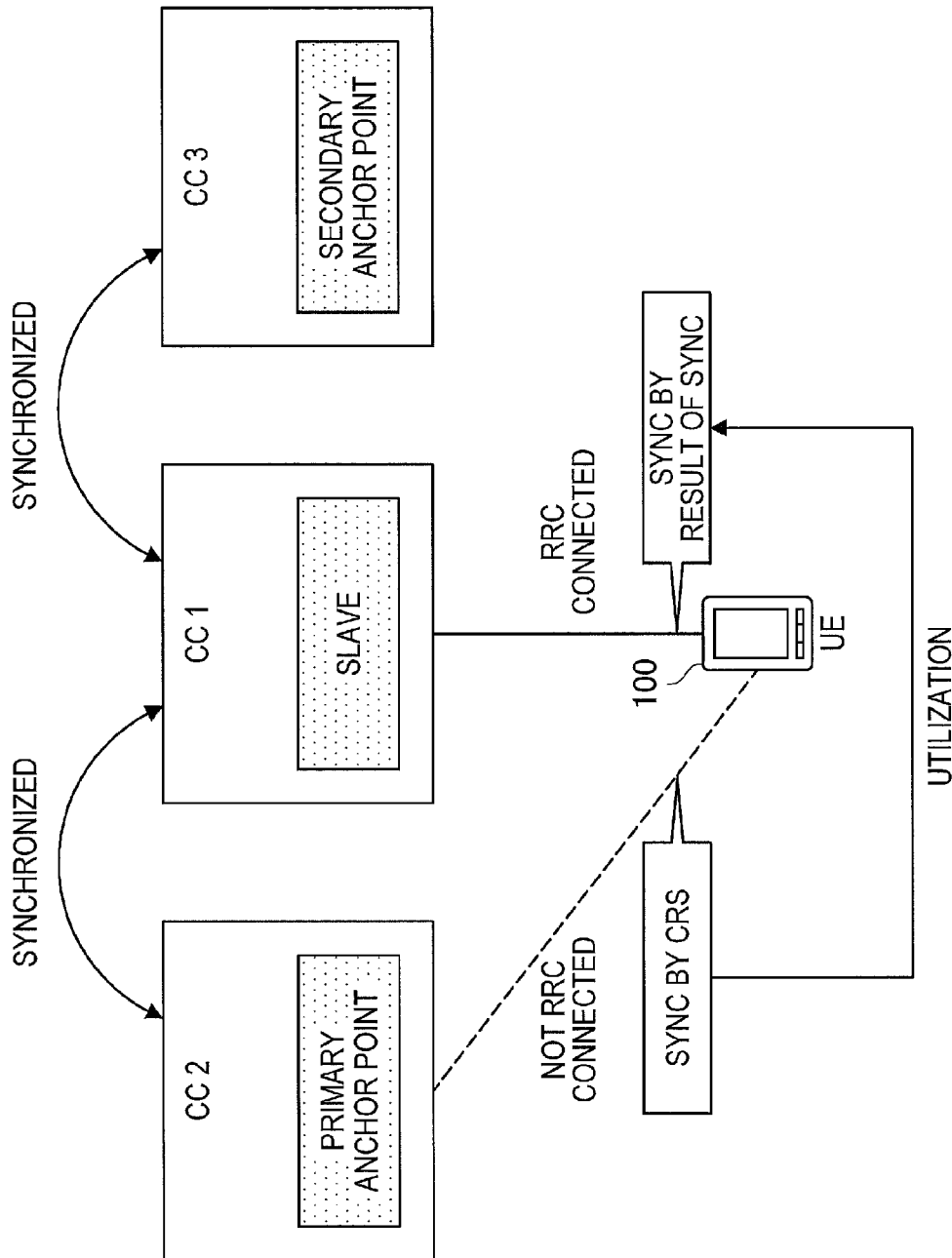
FIG. 19 is an explanatory diagram illustrating an example of a case in which a UE is not connected in a CC.

FIG. 19 is an explanatory diagram illustrating an example of a case in which the UE 100 is not connected in a CC. Referring to FIG. 19, as in FIG. 12A, there are shown the CC 2 and the CC 3 each of which is synchronized with the CC 1. In this example, the CC 1 serves as the slave, the CC 2 serves as the primary anchor point, and the CC 3 serves as the secondary anchor point. In this case, for example, the communication control unit 141 does not allow the UE 100 to enter RRC_Connected in the CC 2. The UE 100 simply establishes synchronization by the CRS in the CC2 and utilizes the synchronization result in the CC 2.

Thus, it is possible to suppress the consumption of resources in the eNodeB using the at least one CC. More specifically, in the RRC_Connected state in the CC, resources in the eNodeB using the CC can be consumed. For example, in the eNodeB, memory resources for holding data addressed to the UE 100, radio resources for signaling to the UE 100, process resources for signaling to the UE 100, and the like can be consumed. Accordingly, as described above, when the UE 100 does not enter RRC_Connected, the consumption of the resources can be suppressed.

Note that, for example, the CC 1 is the CC used in the pico cell 31, and the at least one CC may be a CC used in the macro cell 21. In this case, since a large number of the UEs 100 may exist within the macro cell 21, a particularly large number of resources can be consumed. Accordingly, when the UE 100 does not enter RRC_Connected in the at least one CC (the CC in the macro cell 21), the consumption of the resources can be significantly suppressed.

5. FLOW OF PROCESS

Figure 20:
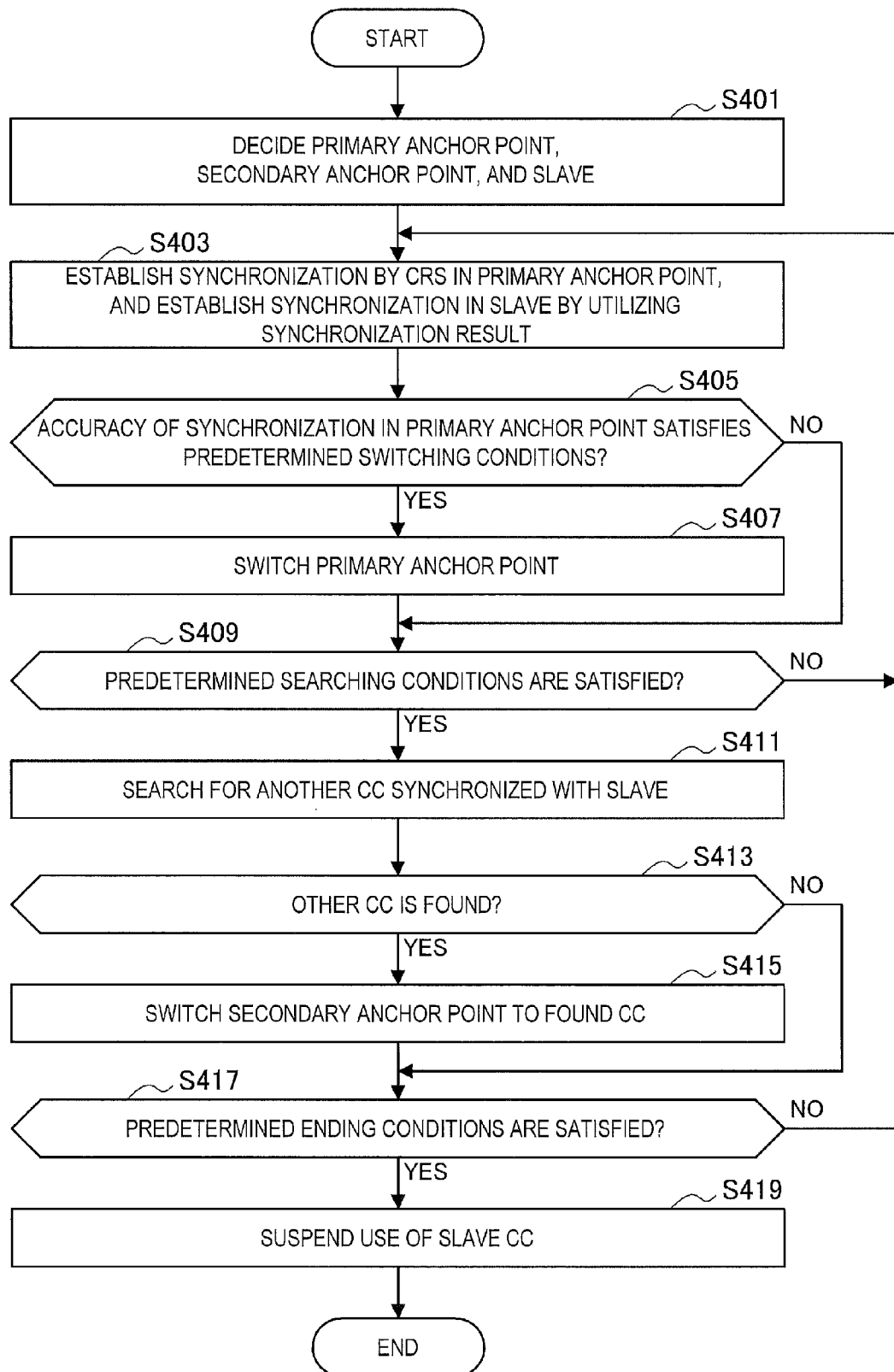
FIG. 20 is a flowchart illustrating an example of a schematic flow of communication control processing according to an embodiment.

Next, an example of communication control processing according to the present embodiment will be described with reference to FIG. 20. FIG. 20 is a flowchart illustrating an example of a schematic flow of communication control processing according to the present embodiment.

First, in step S401, the communication control unit 141 decides the primary anchor point, the secondary anchor point, and the slave.

In step S403, the communication control unit 141 establishes synchronization by the CRS in the primary anchor point, and establishes synchronization in the slave by utilizing the synchronization result in the primary anchor point.

In step S405, the communication control unit 141 determines whether or not the accuracy of synchronization in the primary anchor point satisfies predetermined switching conditions. When the predetermined switching conditions are satisfied, the processing goes to step S407. Otherwise, the processing goes to step S409.

In the step S407, the communication control unit 141 switches the primary anchor point. That is, the communication control unit 141 sets the CC serving as the secondary anchor point at that time to a new primary anchor point. Further, for example, the communication control unit 141 sets the CC that served as the primary anchor point until that time as a new secondary anchor point.

In the step S409, the communication control unit 141 determines whether or not predetermined searching conditions are satisfied. When the predetermined searching conditions are satisfied, the processing goes to step S411. Otherwise, the processing goes back to the step S403.

In the step S411, the communication control unit 141 searches for another CC, other than the primary anchor point and the secondary anchor point at that time, which is synchronized with the slave.

In step S413, the communication control unit 141 determines whether or not the other CC synchronized with the slave is found. When the other CC is found, the processing goes to step S415. Otherwise, the processing goes to step S417.

In the step S415, the communication control unit 141 switches the secondary anchor point to the found CC.

In the step S417, the communication control unit 141 determines whether or not predetermined ending conditions are satisfied. For example, the predetermined ending conditions include the accuracy of synchronization in each CC synchronized with the slave being lower than a predetermined accuracy. When the predetermined ending conditions are satisfied, the processing goes to step S419. Otherwise, the processing goes back to the step S403.

In the step S419, the communication control unit 141 suspends the use of the slave. Then, the processing ends.

6. APPLICATION EXAMPLES

The technology related to the present disclosure can be applied to various products. For example, the UE 100 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 100 may also be realized as a terminal that conducts machine-to-machine (M2M) communication (also called a machine-type communication (MTC) terminal). Furthermore, the UE 100 may be a radio communication module mounted onboard these terminals (for example, an integrated circuit module configured on a single die).

(First Application)

Figure 21:
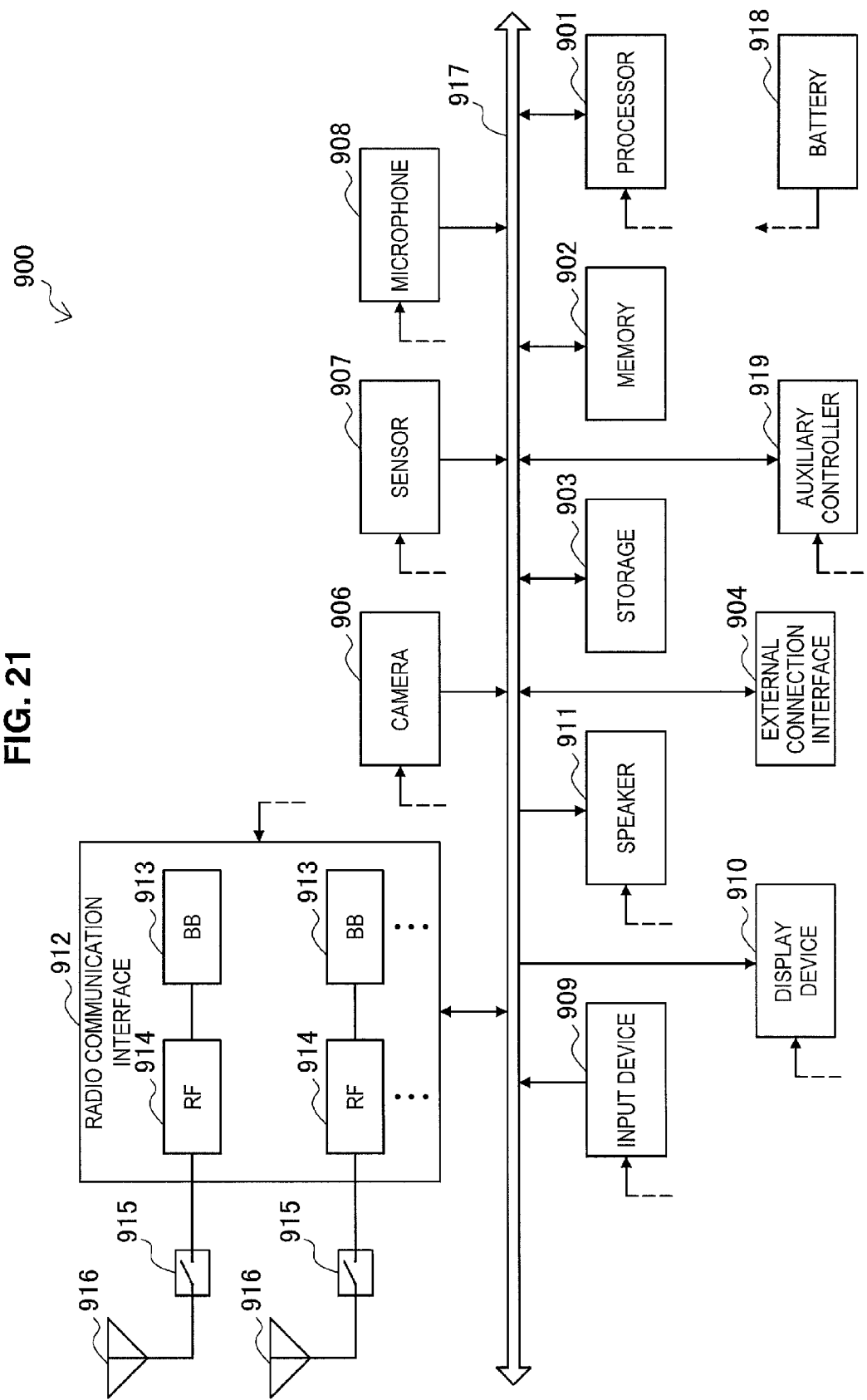
FIG. 21 is a block diagram illustrating an example of a schematic configuration of a smartphone to which the technology according to the present disclosure may be applied.

FIG. 21 is a block diagram illustrating an example of a schematic configuration of a smartphone 900 to which the technology according to the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amplifier, and transmits or receives a radio signal via the antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 21. Note that although FIG. 21 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range radio communication scheme, a near field radio communication scheme, or a wireless local area network (LAN) scheme. In this case, a BB processor 913 and an RF circuit 914 may be included for each radio communication scheme.

Each antenna switch 915 switches the destination of the antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 21. Note that although FIG. 21 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 21 via power supply lines partially illustrated with dashed lines in the drawing. The auxiliary controller 919 causes minimal functions of the smartphone 900 to operate while in a sleep mode, for example.

In the smartphone 900 illustrated in FIG. 26, the communication control unit 141 described with reference to FIG. 11 may be implemented in the radio communication interface 912. Also, at least part of this function may also be implemented in the processor 901 or the auxiliary controller 919.

(Second Application)

Figure 22:
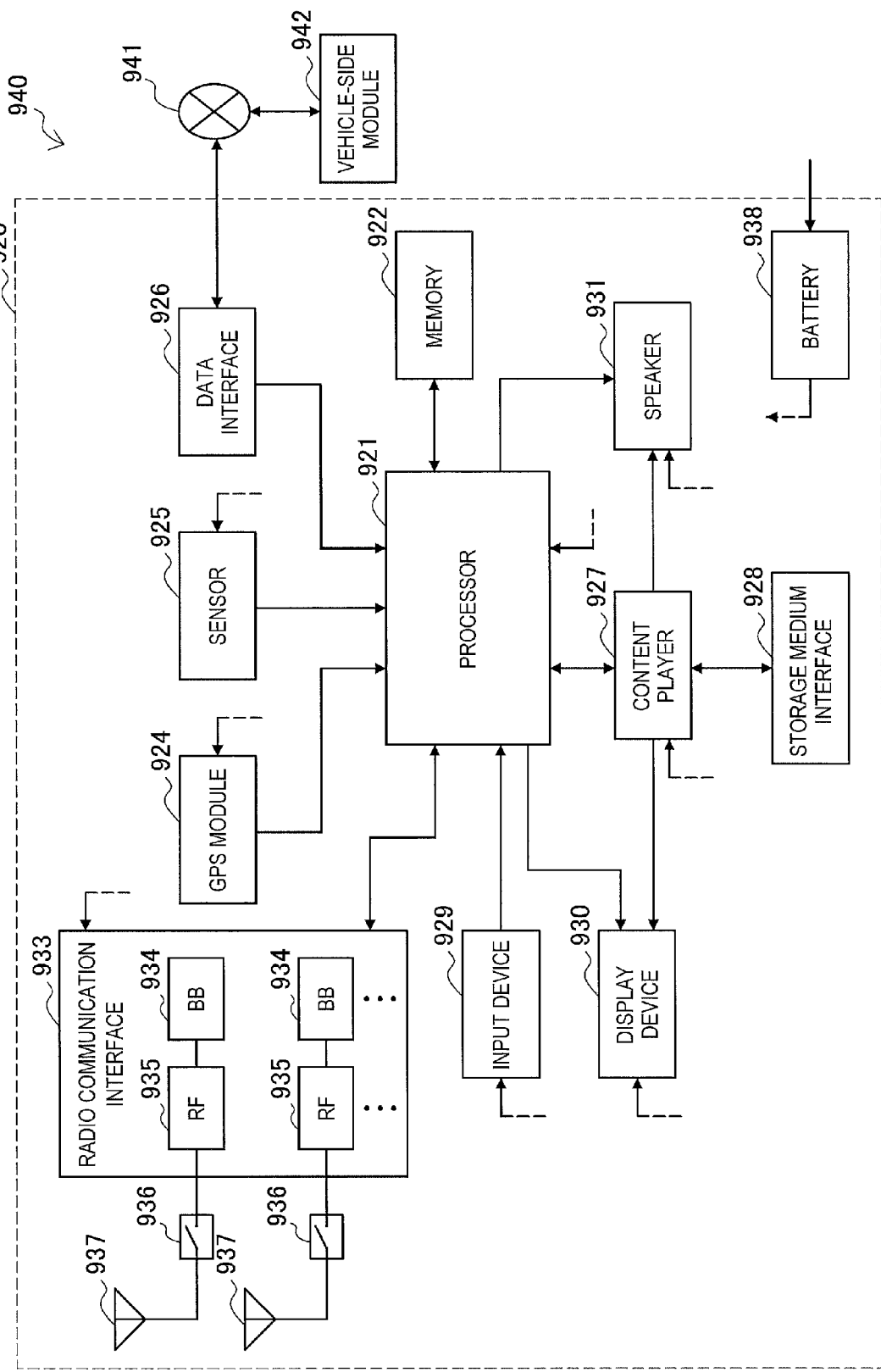
FIG. 22 is a block diagram illustrating an example of a schematic configuration of a car navigation device to which the technology according to the present disclosure may be applied.

FIG. 22 is a block diagram illustrating an example of a schematic configuration of a car navigation device 920 to which the technology according to the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, for example, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amplifier, and transmits and receives a radio signal via the antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 22. Note that although FIG. 22 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range radio communication scheme, a near field radio communication scheme, or a wireless LAN scheme. In this case, a BB processor 934 and an RF circuit 935 may be included for each radio communication scheme.

Each antenna switch 936 switches the destination of the antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 22. Note that although FIG. 22 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 22 via power supply lines partially illustrated with dashed lines in the drawing. Also, the battery 938 stores electric power supplied from the vehicle.

In the car navigation device 920 illustrated in FIG. 22, the communication control unit 141 described with reference to FIG. 11 may be implemented in the radio communication interface 933. Also, at least part of this function may also be implemented in the processor 921.

In addition, the technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

7. CONCLUSION

The communication device and each processing step according to an embodiment of the present disclosure have been described above with reference to FIG. 10 to FIG. 20. According to an embodiment of the present disclosure, the radio communication function is controlled so as to establish synchronization in the CC 2 by the synchronization signal transmitted in the CC 2 synchronized with the CC 1 and to establish synchronization in the CC 1 by utilizing the synchronization result in the CC 2. The CC 1 is also synchronized with the CC 3. In addition, before the radio communication function becomes unable to establish synchronization in the CC 2 by the synchronization signal, the radio communication function is controlled so as to establish synchronization in the CC 3 by the synchronization signal transmitted in the CC 3 and to establish synchronization in the CC 1 by utilizing the synchronization result in the CC 3.

Thus, it becomes possible to further stabilize the communication quality of the radio communication by the UE.

More specifically, before the UE 100 becomes unable to establish synchronization in the CC 2, the primary anchor point is switched from the CC 2 to the CC 3, and therefore, even after the UE 100 becomes unable to establish synchronization in the CC 2 by the CRS, the UE 100 can continue to establish synchronization in the CC 3 by the CRS. Accordingly, it becomes possible for the UE 100 to continue to establish synchronization also in the slave (the CC 1) by utilizing the synchronization result in the primary anchor point. As a result, the communication quality of the radio communication by the UE 100 in the slave (the CC 1) becomes more stable.

Type of Each CC

For example, the CC 1 is a CC in which the synchronization signal is not transmitted in at least any subframe among subframes each of which is a unit of time in the radio communication.

Further, for example, the number of synchronization signals transmitted in the CC 1 is smaller than the number of synchronization signals transmitted in each of the CC 2 and the CC 3.

In such a case, the UE 100 can establish synchronization with a higher accuracy in the CC 1 by establishing synchronization in the CC 1 by utilizing the synchronization result by the CRS in the primary anchor point (the CC 2 or the CC 3) instead of establishing synchronization individually by the CRS in the CC 1. As a result, the communication quality of the radio communication by the UE 100 in the CC 1 becomes more stable.

Further, for example, the number of synchronization signals transmitted in the CC 1 is smaller than the number of synchronization signals required for synchronization in the CC 1.

In such a case, the UE 100 cannot establish synchronization individually by the CRS in the CC 1, but can establish synchronization in the CC 1 by utilizing the synchronization result by the CRS in the primary anchor point (the CC 2 or the CC 3).

Cell Using Each CC

Cell Using Slave

For example, the CC 1 serving as the slave is a CC used in the pico cell 31.

Since the pico cell 31 is a narrow area, due to the movement of the UE 100, it may become difficult to establish synchronization by the CRS in the CC used in the pico cell 31. That is, in a case where the UE 100 moves, the communication quality of the radio communication in the CC used in the pico cell 31 is less likely to be stable. However, as described above, by utilizing the synchronization result in the anchor point for the CC (that is, the slave) of the pico cell 31, the accuracy of synchronization in the CC used in the pico cell 31 may be increased. As a result, the communication quality of the radio communication by the UE 100 in the CC 1 may become more stable.

In addition, when a synchronization result in another CC is utilized for the CC used in the pico cell 31, it becomes possible not to transmit a CRS in the pico cell 31 or to reduce the amount of CRSs transmitted in the pico cell 31. As a result, it becomes possible to increase the throughput in the pico cell 31.

Cell Using Anchor Point

CCs Used in the Same Cell

For example, the CC 2 and the CC 3 are CCs used in the same cell.

In this manner, even when the CC 2 and the CC 3 are CCs used in the same cell, since the frequency band of the CC 2 and the frequency band of the CC 3 are different from each other, the area receiving radio waves in the CC 2 and the area receiving radio waves in the CC 3 may be different from each other. Accordingly, the UE 100 can establish synchronization by the CRS in the CC 3 serving as the secondary anchor point even in an area in which it is difficult to establish synchronization by the CRS in the CC 2 serving as the primary anchor point. Thus, the UE 100 can use the CCs used in the same cell as the primary anchor point and the secondary anchor point, enabling the communication quality of the radio communication by the UE 100 to be more stable. Therefore, even in a case where CCs used in different cells are not mutually synchronized or where the UE 100 is unable to receive signals of different cells, for example, the UE 100 uses the mutually synchronized CCs of the same cell as anchor points, enabling the communication quality in the CC 1 to be more stable.

CCs Used in Mutually Adjacent Cells (Cases 3 and 4)

As another example, the CC 2 and the CC 3 are CCs used in different cells. Further, for example, the CC 2 is a CC used in a first cell, and the CC 3 is a CC used in a second cell that is adjacent to the first cell.

As in Case 3 and Case 4 described above, the CC 2 may be a CC used in a particular cell, and the CC 3 may be a CC used in another cell. In such a case, for example, when the UE 100 is located near the boundary between the cell using the CC 2 and the cell using the CC 3, it is difficult to establish synchronization by the CRS in the CC 2 serving as the primary anchor point, but it is possible to establish synchronization by the CRS in the CC 3 serving as the secondary anchor point. Accordingly, since the CC used in a first cell and the CC used in a second cell that is adjacent to the first cell serve as the anchor points, even in a case where the UE 100 is located near the cell edge, the communication quality in the CC 1 can be more stable.

CC Used in Macro Cell and CC Used in Pico Cell

As another example, the CC 2 and the CC 3 are CCs used in different cells. Furthermore, for example, the CC 2 is one CC of the CC used in the pico cell 31 and the CC used in the macro cell 21. In addition, the CC 3 is the other CC of the CC used in the pico cell 31 and the CC used in the macro cell 21.

Specifically, as an example, the CC 2 is a CC used in the pico cell 31, and the CC 3 is a CC used in the macro cell 21.

Thus, even when the UE 100 moves to be near the cell edge of the pico cell 31 and it becomes difficult to establish synchronization in the primary anchor point (the CC of the pico cell 31), the CC of the macro cell 21 serves as the primary anchor point. Accordingly, the UE 100 can establish synchronization in the new primary anchor point with a high possibility. Thus, the communication quality of the radio communication by the UE 100 in the CC 1 can be more stable.

Specifically, as another example, the CC 2 is a CC used in the macro cell 21, and the CC 3 is a CC used in the pico cell 31.

Thus, even when the UE 100 moves to be near the cell edge of the macro cell 21 and it becomes difficult to establish synchronization in the primary anchor point (the CC of the macro cell 21), the CC of the pico cell 31 (located near the cell edge, for example) serves as the primary anchor point. Accordingly, the UE 100 can establish synchronization in the new primary anchor point. Thus, the communication quality of the radio communication by the UE 100 in the CC 1 can be more stable.

Timing of Switching of Primary Anchor Point

Further, for example, in a case where the accuracy of synchronization in the CC 2 satisfies the predetermined switching conditions, the radio communication function is controlled so as to establish synchronization in the CC 3 and to establish synchronization in the CC 1 by utilizing the synchronization result in the CC 3.

Thus, it becomes possible to further stabilize the communication quality of the radio communication by the UE 100 in the slave (the CC 1).

First Example of Switching Conditions

As a first example, the predetermined switching conditions include the accuracy of synchronization in the CC 2 being lower than the accuracy of synchronization in the CC 3.

Thus, the UE 100 can establish synchronization with a higher accuracy in the slave (the CC 1). As a result, the communication quality of the radio communication by the UE 100 in the slave (the CC 1) becomes more stable.

Second Example of Switching Conditions

As a second example, the predetermined switching conditions may include the accuracy of synchronization in the CC 2 being lower than a predetermined accuracy.

Thus, the UE 100 can establish synchronization in the slave (the CC 1) with an accuracy of a certain level or higher. As a result, the communication quality of the radio communication by the UE 100 in the slave (the CC 1) becomes more stable. In addition, since the acquisition of synchronization and the target of monitoring are limited to the primary anchor point, the load on the UE 100 can be more reduced.

Search for New Anchor Point

Further, for example, in a case where the predetermined search conditions are satisfied, for another CC, other than the CC 2 and CC 3, which is synchronized with the CC 1, is searched for.

Thus, even in a case where a sufficient accuracy of synchronization is not obtained in the secondary anchor point, the new secondary anchor point can be obtained. As a result, it becomes possible to stabilize the communication quality of the radio communication by the UE 100 continuously.

Utilization Method of Anchor Point

For example, the communication control unit 141 does not allow the UE 100 to be connected in a radio resource in at least one CC of the CC 2 and the CC 3. This point will be described below by taking a specific example with reference to FIG. 19.

Thus, it is possible to suppress the consumption of resources in the eNodeB using the at least one CC. More specifically, in the RRC_Connected state in the CC, resources in the eNodeB using the CC can be consumed. For example, in the eNodeB, memory resources for holding data addressed to the UE 100, radio resources for signaling to the UE 100, process resources for signaling to the UE 100, and the like can be consumed. Accordingly, as described above, when the UE 100 does not enter RRC_Connected, the consumption of the resources can be suppressed.

Suspension of Use of Slave

For example, in a case where the predetermined ending conditions are satisfied, the communication control unit 141 suspends the use of the CC 1. The predetermined ending conditions include the accuracy of synchronization in each CC synchronized with the CC 1 being lower than predetermined accuracy.

Thus, in a case where it is difficult to utilize the synchronization result, the use of the slave is suspended. As a result, the generation of a communication error can be suppressed.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the example in which the CC (that is, the slave) on the utilization side of the synchronization result is the CC used in the small cell (that is, the pico cell) has been described above, but the present disclosure is not limited to this example. For example, the slave may be the CC used in the macro cell.

In addition, the example in which only one CC is a candidate (that is, the secondary anchor point) for the CC on the supply side of the synchronization result has been described above, but the present disclosure is not limited to this example. For example, a plurality of CCs may be the secondary anchor points. That is, a plurality of secondary anchor points may be prepared. In this case, any of CCs (for example, CCs with the highest accuracy of synchronization) serving as the secondary anchor points may serve as the next primary anchor point. When another CC synchronized with the slave is found, the found CC may be added as a new secondary anchor point.

The example in which the radio communication function that establishes synchronization is the radio communication unit of the UE has been described above, but the present disclosure is not limited to this example. For example, the radio communication function may be included in the control unit of the UE or may be present in a dispersed manner in the radio communication unit and the control unit of the UE. Furthermore, the communication control function may be a function of another device that is directly or indirectly connected to the UE.

The example indicating that the mutually synchronized frequency bands (for example, the mutually synchronized CCs) are mutually synchronized in both of the time direction and the frequency direction has been described, but the present disclosure is not limited to this example. For example, the mutually synchronized frequency bands may be frequency bands synchronized in the time direction. For example, the mutually synchronized frequency bands may be frequency bands synchronized in the frequency direction. For example, the mutually synchronized frequency bands may be frequency bands synchronized in one of the time direction and the frequency direction.

The pico cell can be exemplified as an example of the small cell, but the present disclosure is not limited to this example. The small cell may be a cell other than the pico cell (for example, a nano cell or a femto cell) partially or entirely overlapping with the macro cell.

The example in which the communication system conforms to LTE-A has been described, but the present disclosure is not limited to this example. For example, the communication system may be a system that conforms to a different standard in 3GPP. For example, the communication system may be a system that conforms to a future standard in 3GPP.

Also, the processing steps in the communication control processing in this specification are not strictly limited to being executed in a time series following the sequence described in a flowchart. For example, the processing steps in the communication control processing may be executed in a sequence that differs from a sequence described herein as a flowchart, and furthermore may be executed in parallel.

In addition, it is possible to create a computer program for causing hardware such as a CPU, ROM, and RAM built into a terminal device (for example, the UE) to exhibit functions similar to each structural element of the foregoing terminal device. Furthermore, a storage medium having the computer program stored therein is provided.

Additionally, the present technology may also be configured as below.

(1)

A terminal device including:

a communication control unit configured to control a radio communication function so as to establish synchronization in a second frequency band by a synchronization signal transmitted in the second frequency band synchronized with a first frequency band, and to establish synchronization in the first frequency band by utilizing a synchronization result in the second frequency band, wherein the first frequency band is synchronized with a third frequency band, and wherein the communication control unit controls the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

(2)

The terminal device according to (1), wherein the first frequency band is a frequency band in which a synchronization signal refrains from being transmitted in at least any one of subframes each of which is a unit of time in radio communication.

(3)

The terminal device according to (2), wherein a number of synchronization signals transmitted in the first frequency band is smaller than a number of synchronization signals transmitted in each of the second frequency band and the third frequency band.

(4)

The terminal device according to (3), wherein the number of synchronization signals transmitted in the first frequency band is smaller than a number of synchronization signals required for synchronization in the first frequency band.

(5)

The terminal device according to any one of (1) to (4), wherein the first frequency band is a frequency band used in a small cell partially or entirely overlapping with a macro cell.

(6)

The terminal device according to any one of (1) to (5), wherein the second frequency band and the third frequency band are frequency bands used in an identical cell.

(7)

The terminal device according to any one of (1) to (5), wherein the second frequency band and the third frequency band are frequency bands used in different cells.

(8)

The terminal device according to (7), wherein the second frequency band is a frequency band used in a first cell, and wherein the third frequency band is a frequency band used in a second cell adjacent to the first cell.

(9)

The terminal device according to (7), wherein the second frequency band is one frequency band of a frequency band used in a small cell partially or entirely overlapping with a macro cell and a frequency band used in the macro cell, and wherein the third frequency band is the other frequency band of the frequency band used in the small cell and the frequency band used in the macro cell.

(10)

The terminal device according to (9), wherein the second frequency band is the frequency band used in the small cell, and wherein the third frequency band is the frequency band used in the macro cell.

(11)

The terminal device according to (9), wherein the second frequency band is the frequency band used in the macro cell, and wherein the third frequency band is the frequency band used in the small cell.

(12)

The terminal device according to any one of (1) to (11), wherein, in a case where an accuracy of synchronization in the second frequency band satisfies predetermined switching conditions, the communication control unit controls the radio communication function so as to establish synchronization in the third frequency band, and to establish synchronization in the first frequency band by utilizing the synchronization result in the third frequency band.

(13)

The terminal device according to (12), wherein the predetermined switching conditions include the accuracy of synchronization in the second frequency band being lower than an accuracy of synchronization in the third frequency band.

(14)

The terminal device according to (12) or (13), wherein the predetermined switching conditions include the accuracy of synchronization in the second frequency band being lower than a predetermined accuracy.

(15)

The terminal device according to any one of (1) to (14), wherein, in a case where predetermined search conditions are satisfied, the communication control unit searches for another frequency band, other than the second frequency band and the third frequency band, which is synchronized with the first frequency band.

(16)

The terminal device according to (15), wherein, in a case where a fourth frequency band is found as the other frequency band, the communication control unit controls the radio communication function so as to establish synchronization in the fourth frequency band by a synchronization signal transmitted in the fourth frequency band and to establish synchronization in the first frequency band by utilizing a synchronization result in the fourth frequency band, instead of establishing synchronization in the third frequency band, before the radio communication function becomes unable to establish synchronization in the second frequency band by the synchronization signal.

(17)

The terminal device according to any one of (1) to (16), wherein the communication control unit prevents the terminal device from being connected in a radio resource in at least one frequency band of the second frequency band and the third frequency band.

(18)
The terminal device according to any one of (1) to (17),
wherein, in a case where predetermined ending conditions are satisfied, the communication control unit suspends use of the first frequency band, and
wherein the predetermined ending conditions include an accuracy of synchronization in each frequency band synchronized with the first frequency band being lower than a predetermined accuracy.

(19)
A program for causing a computer to function as:
a communication control unit configured to control a radio communication function so as to establish synchronization in a second frequency band by a synchronization signal transmitted in the second frequency band synchronized with a first frequency band, and to establish synchronization in the first frequency band by utilizing a synchronization result in the second frequency band,
wherein the first frequency band is synchronized with a third frequency band, and
wherein the communication control unit controls the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

(20)
A communication control method including:
controlling a radio communication function so as to establish synchronization in a second frequency band by a synchronization signal transmitted in the second frequency band synchronized with a first frequency band, and to establish synchronization in the first frequency band by utilizing a synchronization result in the second frequency band,
wherein the first frequency band is synchronized with a third frequency band, and
wherein the communication control method further includes controlling the radio communication function so as to establish synchronization in the third frequency band by a synchronization signal transmitted in the third frequency band, and to establish synchronization in the first frequency band by utilizing a synchronization result in the third frequency band, before the radio communication function becomes unable to establish synchronization in the second frequency band by the synchronization signal.

REFERENCE SIGNS LIST 1 communication system
21 macro cell
31 pico cell
100 UE (user equipment)
120 radio communication unit
151 communication control unit
200 macro eNodeB
300 pico eNodeB

The invention claimed is:
1. A terminal device, comprising:
a communication control unit configured to:
control a radio communication function to establish a first synchronization in a second frequency band that is synchronized with a first frequency band, wherein the first synchronization is established by a first synchronization signal transmitted in the second frequency band;
control the radio communication function to establish a second synchronization in the first frequency band based on the first synchronization in the second frequency band;
control the radio communication function to establish a third synchronization in a third frequency band by a second synchronization signal transmitted in the third frequency band, wherein the first frequency band is synchronized with the third frequency band; and
control the radio communication function to establish a fourth synchronization in the first frequency band based on the third synchronization in the third frequency band.

2. The terminal device according to claim 1, wherein the first frequency band is a frequency band in which a synchronization signal refrains from transmission in at least one of a plurality of subframes, wherein each of the plurality of subframes is a unit of time in a radio communication.

3. The terminal device according to claim 2, wherein a first number of synchronization signals transmitted in the first frequency band is smaller than a second number of synchronization signals transmitted in each of the second frequency band and the third frequency band.

4. The terminal device according to claim 3, wherein the first number of synchronization signals transmitted in the first frequency band is smaller than a third number of synchronization signals required for synchronization in the first frequency band.

5. The terminal device according to claim 1, wherein the first frequency band is used in a small cell, wherein the small cell partially or entirely overlaps a macro cell.

6. The terminal device according to claim 1, wherein the second frequency band and the third frequency band are frequency bands used in an identical cell.

7. The terminal device according to claim 1, wherein the second frequency band and the third frequency band are frequency bands used in different cells.

8. The terminal device according to claim 7,
wherein the second frequency band is used in a first cell,
wherein the third frequency band is used in a second cell, and
wherein the second cell is adjacent to the first cell.

9. The terminal device according to claim 7,
wherein the second frequency band is one of frequency bands used in a small cell that partially or entirely overlaps with a macro cell, or a frequency band used in the macro cell, and
wherein the third frequency band is another of the frequency bands used in the small cell or the frequency band used in the macro cell.

10. The terminal device according to claim 9,
wherein the second frequency band is used in the small cell, and
wherein the third frequency band is used in the macro cell.

11. The terminal device according to claim 9,
wherein the second frequency band is used in the macro cell, and
wherein the third frequency band is used in the small cell.

12. The terminal device according to claim 1,
wherein, in a case where a first accuracy of the first synchronization in the second frequency band satisfies a plurality of switching conditions, the communication control unit controls the radio communication function to establish the third synchronization in the third frequency band, and to establish the fourth synchronization in the first frequency band based on the third synchronization in the third frequency band.

13. The terminal device according to claim 12, wherein the plurality of switching conditions include the first accuracy of the first synchronization in the second frequency band, and wherein the first accuracy is lower than a second accuracy of the third synchronization in the third frequency band.

14. The terminal device according to claim 12, wherein the plurality of switching conditions include the first accuracy of the first synchronization in the second frequency band which is lower than a threshold accuracy.

15. The terminal device according to claim 1, wherein, based on a plurality of search conditions, the communication control unit is further configured to search for a fourth frequency band, wherein the fourth frequency band is different from each of the second frequency band and the third frequency band, and wherein the fourth frequency band is synchronized with the first frequency band.

16. The terminal device according to claim 15, wherein the communication control unit is further configured to:
control the radio communication function to establish a fifth synchronization in the fourth frequency band by a third synchronization signal in the fourth frequency band; and
control the radio communication function to establish a sixth synchronization in the first frequency band based on the fifth synchronization in the fourth frequency band.

17. The terminal device according to claim 1, wherein the communication control unit is further configured to suspend a connection of the terminal device in a radio resource in at least one of the second frequency band or the third frequency band.

18. The terminal device according to claim 1,
wherein the communication control unit is further configured to suspend a use of the first frequency band based on a plurality of ending conditions, and
wherein the plurality of ending conditions include an accuracy of synchronization in each frequency band synchronized with the first frequency band, wherein the accuracy of synchronization is lower than a threshold accuracy.

19. A non-transitory computer-readable medium having stored thereon computer-readable instructions, which when executed by processor of a first wireless communication apparatus, cause the first wireless communication apparatus to execute operations, the operations comprising:
controlling a radio communication function to establish a first synchronization in a second frequency band that is synchronized with a first frequency band, wherein the first synchronization is established by a first synchronization signal transmitted in the second frequency band;
controlling the radio communication function to establish a second synchronization in the first frequency band based on the first synchronization in the second frequency band;
controlling the radio communication function to establish a third synchronization in a third frequency band by a second synchronization signal transmitted in the third frequency band, wherein the first frequency band is synchronized with the third frequency band; and
controlling the radio communication function to establish a fourth synchronization in the first frequency band based on the third synchronization in the third frequency band.

20. A communication control method, comprising:
controlling a radio communication function to establish a first synchronization in a second frequency band that is synchronized with a first frequency band, wherein the first synchronization is established by a first synchronization signal transmitted in the second frequency band;
controlling the radio communication function to establish a second synchronization in the first frequency band based on the first synchronization in the second frequency band;
controlling the radio communication function to establish a third synchronization in a third frequency band by a second synchronization signal transmitted in the third frequency band, wherein the first frequency band is synchronized with the third frequency band; and
controlling the radio communication function to establish a fourth synchronization in the first frequency band based on the third synchronization in the third frequency band.

* * * * *